(12) United States Patent
Healy et al.

(10) Patent No.: US 12,122,357 B2
(45) Date of Patent: Oct. 22, 2024

(54) DRIVE TRAIN CONFIGURATIONS FOR A VEHICLE AGNOSTIC TO A POWER SOURCE

(71) Applicant: Hyliion Inc., Cedar Park, TX (US)

(72) Inventors: Thomas Healy, Austin, TX (US);
Patrick Sexton, Austin, TX (US);
Robert Butler, Liberty Hill, TX (US);
Brian Schoolcraft, Cedar Park, TX (US)

(73) Assignee: Hyliion Inc., Cedar Park, TX (US)

( * ) Notice: Subject to any disclaimer, the term of this patent is extended or adjusted under 35 U.S.C. 154(b) by 133 days.

(21) Appl. No.: 17/322,470

(22) Filed: May 17, 2021

(65) Prior Publication Data

US 2021/0354684 A1    Nov. 18, 2021

Related U.S. Application Data

(60) Provisional application No. 63/026,371, filed on May 18, 2020.

(51) Int. Cl.
*B60W 20/40* (2016.01)
*B60K 6/26* (2007.10)
(Continued)

(52) U.S. Cl.
CPC .............. *B60W 20/40* (2013.01); *B60K 6/26* (2013.01); *B60K 6/28* (2013.01); *B60K 6/387* (2013.01);
(Continued)

(58) Field of Classification Search
CPC ...... B60W 20/40; B60W 10/02; B60W 10/06; B60W 10/08; B60W 2300/12;
(Continued)

(56) References Cited

U.S. PATENT DOCUMENTS 10,974,724 B1 * 4/2021 Shively ............... B60K 6/38
2011/0276241 A1   11/2011 Nakao
(Continued)

FOREIGN PATENT DOCUMENTS

CN    201881879 U  *  6/2011
EP       0775607 B1     8/2001
(Continued)

OTHER PUBLICATIONS

Machine Translation of CN201881879U PDF file Name: "CN201881879U_Machine_Translation.pdf".*

(Continued)

*Primary Examiner* — Grant Moubry
*Assistant Examiner* — Ruben Picon-Feliciano
(74) *Attorney, Agent, or Firm* — Baker Botts L.L.P.

(57) ABSTRACT

A drive train for installation in a vehicle chassis includes a power source, two motor/generators (M/Gs), an array of batteries, and a control system for configuring the drive train to operate using only the power source, only the batteries or a combination of the power source and batteries. The control system may open or close clutches to configure the drive train with each M/G working as a motor or a generator. A M/G working as a motor may use power from the batteries to supply rotational power to drive the vehicle or operate accessories on the vehicle. A M/G working as a generator coupled to a power source generates electric power for charging the array of batteries. The vehicle, including components and subsystems, may be powered electrically from the batteries or powered from the engine.

20 Claims, 16 Drawing Sheets

(51) Int. Cl.
    *B60K 6/28*     (2007.10)
    *B60K 6/387*     (2007.10)
    *B60K 6/52*     (2007.10)
    *B60K 17/02*     (2006.01)
    *B60K 17/356*     (2006.01)
    *B60K 17/36*     (2006.01)
    *B60W 10/02*     (2006.01)
    *B60W 10/06*     (2006.01)
    *B60W 10/08*     (2006.01)

(52) U.S. Cl.
    CPC ............... *B60K 6/52* (2013.01); *B60K 17/02* (2013.01); *B60K 17/356* (2013.01); *B60K 17/36* (2013.01); *B60W 10/02* (2013.01); *B60W 10/06* (2013.01); *B60W 10/08* (2013.01); *B60W 2300/12* (2013.01); *B60W 2510/244* (2013.01); *B60W 2520/04* (2013.01); *B60W 2710/021* (2013.01); *B60W 2710/0644* (2013.01); *B60W 2710/08* (2013.01); *B60Y 2200/92* (2013.01); *B60Y 2400/82* (2013.01)

(58) Field of Classification Search
    CPC ....... B60W 2510/244; B60W 2520/04; B60W 2710/021; B60W 2710/0644; B60W 2710/08; B60K 6/26; B60K 6/28; B60K 6/387; B60K 6/52; B60K 17/02; B60K 17/356; B60K 17/36; B60Y 2200/92; B60Y 2400/82
See application file for complete search history.

(56) References Cited

U.S. PATENT DOCUMENTS

| | | | |
|---|---|---|---|
| 2017/0174067 A1* | 6/2017 | Soto | B60K 15/10 |
| 2018/0093655 A1 | 4/2018 | Healy | |
| 2020/0269675 A1* | 8/2020 | Haka | F16H 3/728 |
| 2021/0107483 A1* | 4/2021 | Shively | B60K 6/52 |
| 2022/0105793 A1* | 4/2022 | Sukhatankar | B60K 25/06 |

FOREIGN PATENT DOCUMENTS

| | | |
|---|---|---|
| EP | 1588885 A2 | 10/2005 |
| EP | 2762351 A1 | 8/2014 |
| EP | 2896542 A1 | 7/2015 |
| EP | 3235670 A1 | 10/2017 |

OTHER PUBLICATIONS

International Search Report and Written Opinion, Application No. PCT/US2021/032774, Aug. 23, 2021, 14 pages.

European Office Action, Application No. 21731642.1, Nov. 6, 2023, 7 pages.

Koutsorodis, Dafni, European Office Action, European Application No. 21731642.1, Aug. 1, 2024, 8 pages, pub. by European Patent Office, Rijswijk Netherlands.

* cited by examiner

DRIVE TRAIN CONFIGURATIONS FOR A VEHICLE AGNOSTIC TO A POWER SOURCE

PRIORITY CLAIM

The present application claims priority to U.S. Provisional Patent Application Ser. No. 63/026,371, filed May 18, 2020, which is incorporated by reference herein in its entirety.

BACKGROUND

Field of the Disclosure

This disclosure relates generally to vehicles and, more particularly, to a wheeled vehicle configurable for different drive train configurations.

Description of the Related Art

Large vehicles may be used to transport cargo. Large, wheeled vehicles pull trailers to transport large volumes of cargo on land, wherein the combination of the vehicle and the trailer can weigh between 30,000 pounds up to 140,000 pounds for a tandem loaded trailer. These vehicles may be referred to as "powered semi-tractors", "semi-tractors", "semis", or "trucks." Trucks may be used on roads such as highways and in urban areas but may also be used on unimproved roads or uneven terrain. In a traditional truck with an internal combustion engine, the internal combustion engine may be sized in the range of 15 liters to provide enough power to propel the vehicle and the trailer.

SUMMARY

A vehicle used for transporting cargo may comprise a drive train capable of multiple unique configurations for maximizing the operating range of the vehicle over different terrains and conditions, using one or more of a power source, a pair of electric motors and an array of batteries.

A wheeled vehicle such as a truck having a front axle and two rear axles may be configured with unique drive train configurations capable of providing power to one or more of the axles.

In one aspect, a vehicle comprises a chassis, a cab and an engine compartment. A drive train on the vehicle comprises a power source, two motor/generators (M/Gs), a battery system comprising an array of batteries, a plurality of axles and a plurality of clutches for selectively coupling the power source and M/Gs to the axles.

A battery management system may monitor the performance of the battery system and configure the drivetrain to maintain an operating temperature of one or more batteries within a range of operating temperatures. A control system may monitor the operating conditions of the vehicle, monitor the performance of the battery system, monitor one or more environmental conditions, monitor a set of operating parameters of a power source coupled to the generator, and may configure the drive train to use rotational power from the power source based on the operating temperature of the battery system, the one or more environmental conditions and the set of operating parameters of the power source and engage one or more axles to drive the vehicle or disengage all axles.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, embodiments are described as they pertain to a truck having a chassis, a cab, an engine compartment and a battery enclosure storing a battery system comprising a plurality of batteries. Embodiments may also pertain to other wheeled vehicles with more or fewer axles and other vehicles.

Particular embodiments may be best understood by reference to FIGS. 1A-1B, 2-4, 5A-5J and 6, wherein like numbers are used to indicate like and corresponding parts.

Figure 1A:
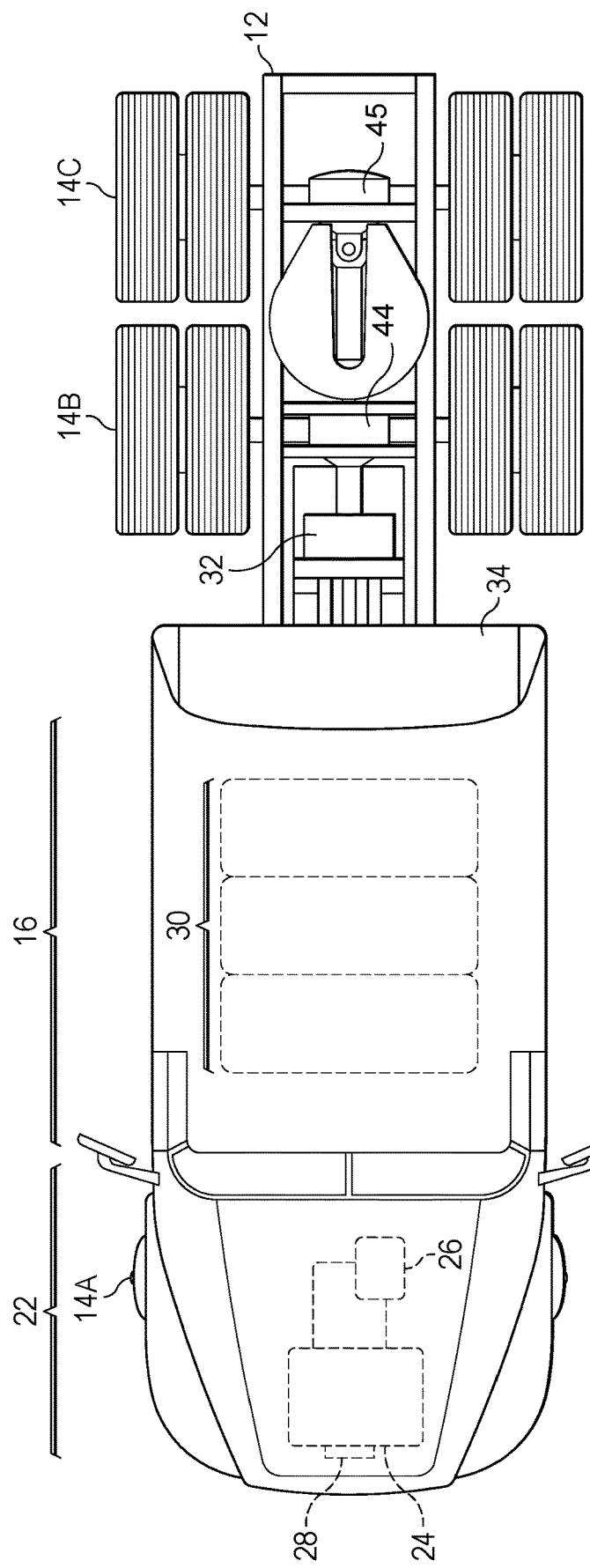
FIGS. 1A and 1B depict top and side partial views of one embodiment of a wheeled vehicle capable of transporting cargo over an extended range.
Figure 1B:
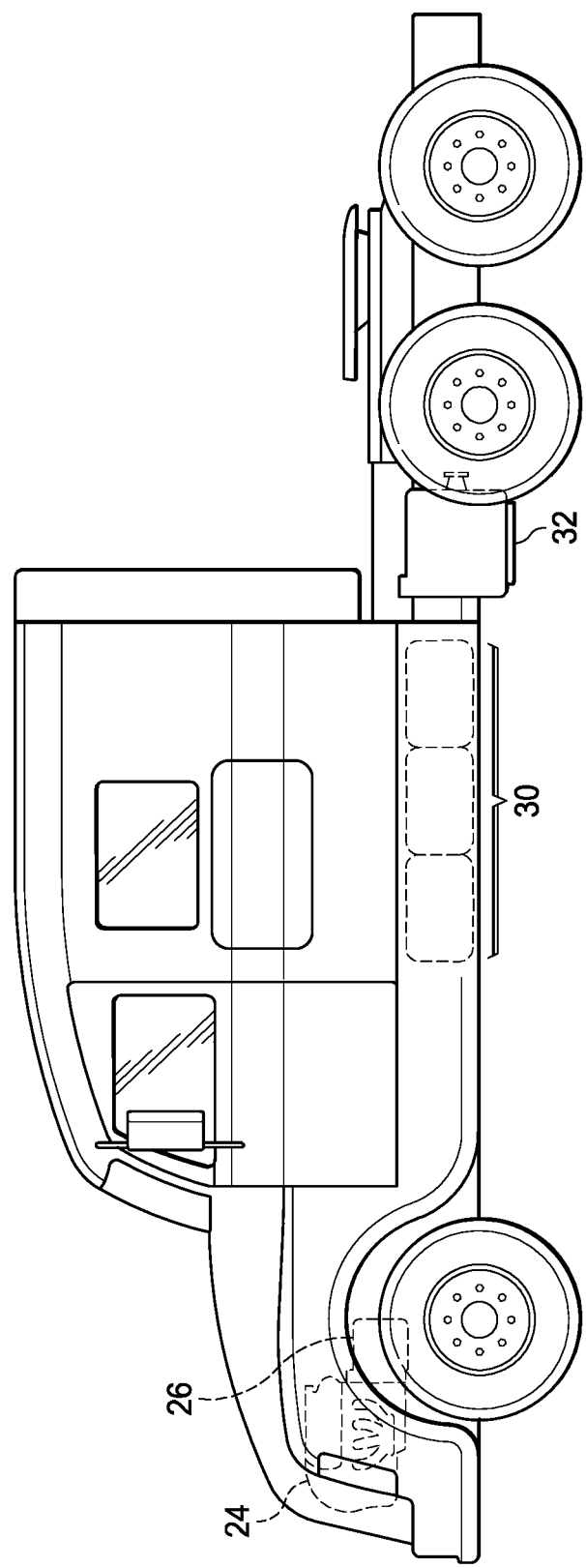

Turning now to the drawings, FIGS. 1A and 1B depict top and partial side views of a wheeled vehicle 10, such as a truck or semi-tractor used to pull one or more trailers with cargo.

As shown in FIGS. 1A and 1B, vehicle 10 may include chassis 12, which may support multiple axles 14 (e.g., front axle 14A and rear axles 14B, 14C), cab 16, engine compartment 22 containing power source 24 and M/G 26, batteries 30 and M/G 32. Vehicle 10 may further include rear pack 34 or contain fuel tanks (not shown) for power source 24 or other equipment.

Chassis 12 may be formed with two frame members such as C-channels arranged parallel to each other. Axles 14 coupled to chassis 12 may include front axle 14A located under engine compartment 22 and rear axles 14B and 14C located behind cab 16.

In some embodiments, engine compartment 22 may be in front of cab 16 and contains power source 24, M/G 26 and radiator 28. Coolant such as glycol or some other anti-freeze liquid may be circulated through radiator 28 and power source 24 to remove heat from power source 24 to the ambient air.

As used herein, the term "battery system" may refer to a single battery 30 or a plurality of batteries 30 on vehicle 10. In some embodiments, a battery system may be located on chassis 12. In some embodiments, one or more batteries 30 may be located between, under or around the rails of chassis 12. An array of batteries 30 may be connected in series, parallel or some combination. The number of batteries 30 in a battery system may depend on the type of battery 30, a charge capacity of the battery 30, the size of vehicle 10, the weight of vehicle 10 (including or excluding any weight carried by vehicle 10) a distance vehicle 10 is expected to travel, or some other operating parameter of vehicle 10.

M/G 32 may be coupled to at least one rear axle 14B, 14C. In some embodiments, M/G 32 may be integrated with an axle 14 as an e-axle configuration or located in a hub of a wheel coupled to an axle 14 as a hub motor configuration. Embodiments of vehicle 10 may include M/G 32 coupled to gear boxes or differentials. For example, as depicted in FIG. 1A, M/G 32 may be coupled to a three-speed centralized gear box 44 with a two-speed rear differential 45 to provide six discrete gear ratios.

Figure 2:
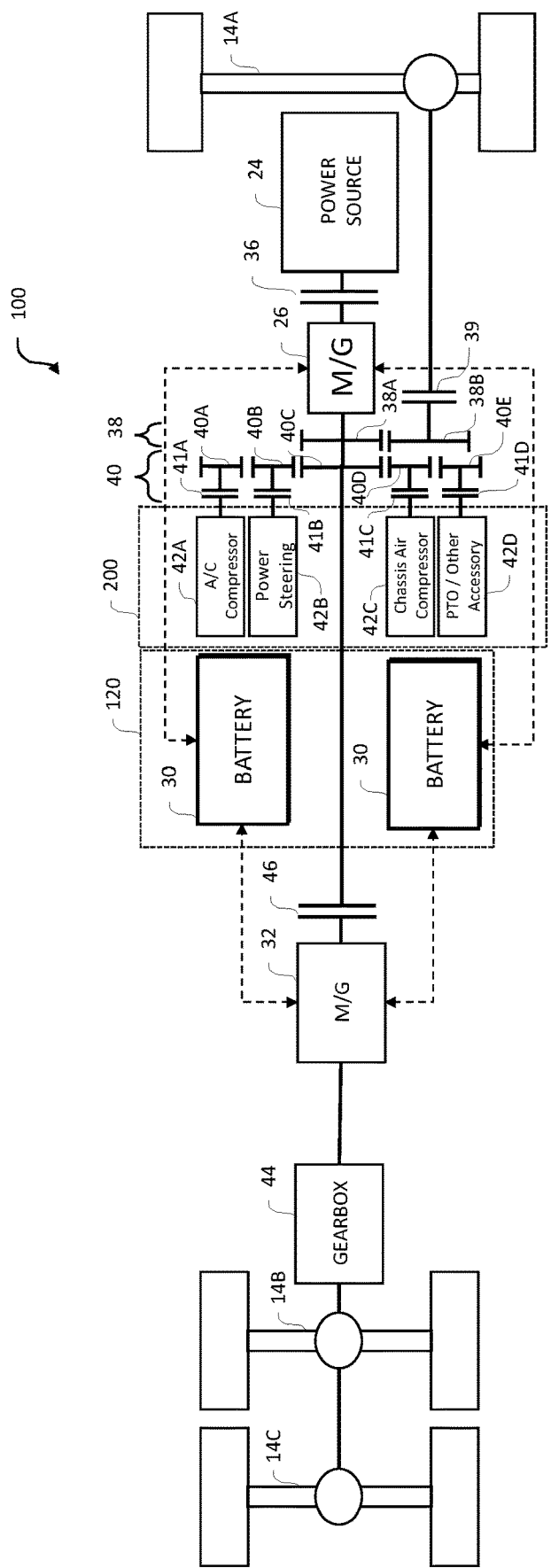
FIG. 2 depicts a schematic diagram of one embodiment of the vehicle depicted in FIGS. 1A and 1B.

Turning to FIG. 2, in some embodiments, drive train 100 comprises power source 24, M/G 26, battery system 120 comprising a plurality of batteries 30 and M/G 32, wherein one or more of power source 24, M/G 26, and M/G 32 may be engaged to one or more of front axle 14A and rear axles 14B and/or 14C for driving vehicle 10. In some embodiments, drive train 100 may further include accessory gear pass 40 with clutches 41 for selective engagement of one or more accessories 42 in accessory system 200.

In some embodiments, vehicle 10 may be configured with a power source 24, whereby power source 24 may be mechanically engaged to M/G 26 through clutch 36 when clutch 36 is closed and disengaged from M/G 26 when clutch 36 is open. In these embodiments, vehicle 10 may be agnostic to power source 24 such that power source 24 may be a conventional type of engine such as an internal combustion (IC) engine (also referred to as an ICE) that may be configured to operate using gasoline, diesel, natural gas (NG) including compressed natural gas (CNG), liquid natural gas (LNG) and renewable natural gas (RNG), or other types of power source including, but not limited to gas turbines and fuel cells, which may operate on hydrogen, natural gas, propane or some other fuel source.

Embodiments of vehicle 10 with power source 24 coupled to M/G 26 only may facilitate installation of high density power sources 24 with smaller displacements. For example, embodiments may utilize a conventional diesel engine with a displacement between 6-12 liters instead of a 15 liter displacement. If a smaller power source 24 is installed in engine compartment 22, engine compartment 22 may have more room for additional components, or installation and removal of power source 24 may be easier. In various embodiments, vehicle 10 may be configured with standardized mounts in engine compartment 22 to allow vehicle 10 to be outfitted with different types of power sources 24.

M/G 26 may operate as a motor or a generator. In some embodiments, M/G 26 may be sized based on an operating range of power source 24. For example, a turbine power source 24 may have an operating range of 40,000-120,000 RPM and M/G 26 may be sized to generate electric power efficiently for that operating range. As another example, vehicle 10 may be outfitted with a diesel power source 24 having a preferred operating range of 1200-2400 RPM and M/G 26 may be sized to generate electric power efficiently for that operating range. The ability to operate power source 24 within a preferred operating range may increase the efficiency and/or service life of power source 24. In some embodiments, vehicle 10 may use a decontented power source 24 with a lower power rating or higher durability by operating power source 24 within a smaller operating range. For example, the diesel power source 24 mentioned above may have an operating range of 800-3000 RPM, a preferred operating range of 1200-2400 RPM and an optimal operating range of 1500-1800 RPM.

In some embodiments, power source 24 and M/G 26 may be integrated as a single unit. Integrating power source 24 and M/G 26 in a single unit may reduce the overall size of engine compartment 22 needed to contain power source 24. In some embodiments, a modular design with power source 24, M/G 26 and clutch 36 integrated as a single unit may be easier to connect to standardized mount locations and may have fewer connections and couplings for easier installation, maintenance and/or removal from vehicle 10.

During operation of vehicle 10, power source 24 may be powered on and clutch 36 may be closed to engage power source 24 to M/G 26. In some configurations, rotational power supplied by power source 24 to M/G 26 generates electric power only. The electric power may be used to charge one or more batteries 30 in battery system 120 or may be transmitted to components directly. In some configurations, rotational power supplied by power source 24 to M/G 26 generates rotational power only. In some configurations, rotational power supplied by power source 24 to M/G 26 generates rotational power and electric power.

In some embodiments, drive train 100 comprises front axle gear pass 38 (38A and 38B) for transferring rotational power from M/G 26 to front axle 14A when clutch 39 is closed. When clutch 39 is open, no rotational power is transferred to or from front axle 14A.

In some embodiments, drive train 100 comprises accessory gear pass 40 for transferring rotational power to one or more accessories 42 (e.g., accessories 42A-42D). In some configuration, when clutch 36 is open and clutch 46 is open, rotational power from M/G 26 may be transmitted to accessory gear pass 40. In some configuration, when clutch 36 is open and clutch 46 is closed, rotational power from M/G 32 may be transmitted to accessory gear pass 40.

In some embodiments, all accessories 42 may be coupled to accessory gear pass 40 such that any power needed by accessories 42 comprises rotational power supplied by M/G 26. In some configurations, when power source 24 is active and mechanically coupled to M/G 26 through clutch 36, rotational power needed by accessories 42 comprises rotational power supplied by power source 24. In some configurations, when power source 24 is mechanically decoupled from M/G 26, rotational power needed by accessories 42 comprises rotational power supplied by M/G 26. In some embodiments, vehicle 10 may be configured with power source 24 coupled to M/G 26 such that M/G 26 replaces the alternator and power generated by M/G 26 operates a water pump and any accessories. Using this arrangement, the displacement and overall size associated with power source 24 may be reduced and components and accessories 42 may be located elsewhere in engine compartment 22 or elsewhere on chassis 12 of vehicle 10. By way of background, in a traditional drive train for vehicle, an internal combustion engine (ICE) is mechanically coupled to a water pump and the ICE is further coupled to accessories via a belt. The accessories may include an air conditioning (A/C) compressor 42A, an alternator, a power steering pump 42B and a chassis air compressor 42C. Thus, the ICE in a traditional drive train needs to be large enough to propel the vehicle and provide rotational power to the water pump and all accessories associated with the belt. The additional power demands result in the ICE being engineered to operate over a wide range of operating speeds and loads, adding cost and complexity.

One or more of clutches 41 may be open or closed to manage power supplied to accessories 42. For example, clutch 41A may be closed to engage air conditioning (A/C) compressor 42A such that rotational power from M/G 26 is supplied to air conditioning (A/C) compressor 42A, clutch 41B may be closed to engage power steering pump 42B such that rotational power from M/G 26 is supplied to power steering pump 42B, clutch 41C may be closed to engage chassis air compressor 42C such that rotational power from M/G 26 is supplied to chassis air compressor 42C and clutch 41D may be closed to engage power take off (PTO) or some other accessory 42D such that rotational power from M/G 26 is supplied to other accessories such as power take-off (PTO)/other accessory 42D. Clutches 36 and 41 may be unidirectional such that rotational power passes through clutches 36 and 41 in only one rotation direction.

M/G 32 may operate as a motor or a generator. In some embodiments, M/G 32 may be sized based on a desired output power to one or more rear axles 14B and 14C. For example, in some embodiments, M/G 32 may be configured to supply an output power of 500 horsepower (hp) to gear box 44 for output to one or more rear axles 14B and 14C.

Vehicle 10 may have two rear axles 14B, 14C. As depicted in FIG. 2, in some embodiments, vehicle 10 comprises gear box 44 coupled to rear axles 14B and 14C and M/G 32 coupled to gear box 44. Rotational power from one or more of power source 24, M/G 26 and M/G 32 may be supplied to gear box 44 for supplying power to one or more of rear axles 14B and 14C. In some embodiments (not shown), M/G 32 may be coupled to each rear axle 14B and 14C or wheels coupled to each rear axle 14B, 14C.

For ease of understanding symbols in the drawings, when referring to clutches 36, 39, 41A-41D and 46, two parallel lines indicate an open position and a solid black box indicates a closed position. When referring to axles 14A, 14B and 14C, a solid black circle indicates rotational power may be transmitted through the axle 14 and an outline of a circle indicates no rotational power is transmitted through the axle 14. When referring to electric power, a heavy dashed line indicates electric power is being transferred, wherein an arrow indicates the direction of transfer.

Vehicle Configurable for Different Modes of Operation

Embodiments of vehicle 10 configured with all components and subsystems capable of drawing power from battery system 120 allows vehicle 10 to operate in different modes. For example, in a driving mode, vehicle 10 may be moving and power source 24 may be turned on or off as needed to generate rotational power supplied to M/G 26 to supply electric power to charge battery system 120 or supply electric power directly to M/G 32 to generate rotational power to drive vehicle 10. In an auxiliary power unit (APU) mode, power source 24 may be turned off and power may be drawn from battery system 120. APU mode may be used to supply power to a trailer for refrigeration of contents in the trailer or to operate a pump on the trailer. APU mode may be available when vehicle 10 is not moving, such as when a driver is tired or is required to pull over and rest. In some embodiments, power source 24 may generate electric power to support power take-off (PTO) needs and battery system 120 may supply power to support PTO needs or some other need. In some embodiments, power source 24 comprises a mechanical PTO and a system controller may operate power source 24 in a preferred range of operation and use excess power to charge battery system 120. In an emergency operation (EO) mode, vehicle 10 may or may not be moving and power source 24 may generate electric power for use on systems outside of vehicle 10 or systems may operate off battery power in APU mode or PTO mode. In some embodiments, vehicle 10 may be coupled with a trailer configured with a secondary battery compartment for additional driving range or extended operation in one or more of APU mode, PTO mode or EO mode. In some embodiments, a charging port for batteries 30 may be used to couple an external battery pack to vehicle 10 for additional driving range or extended operation.

Engine Start Mode

Figure 3:
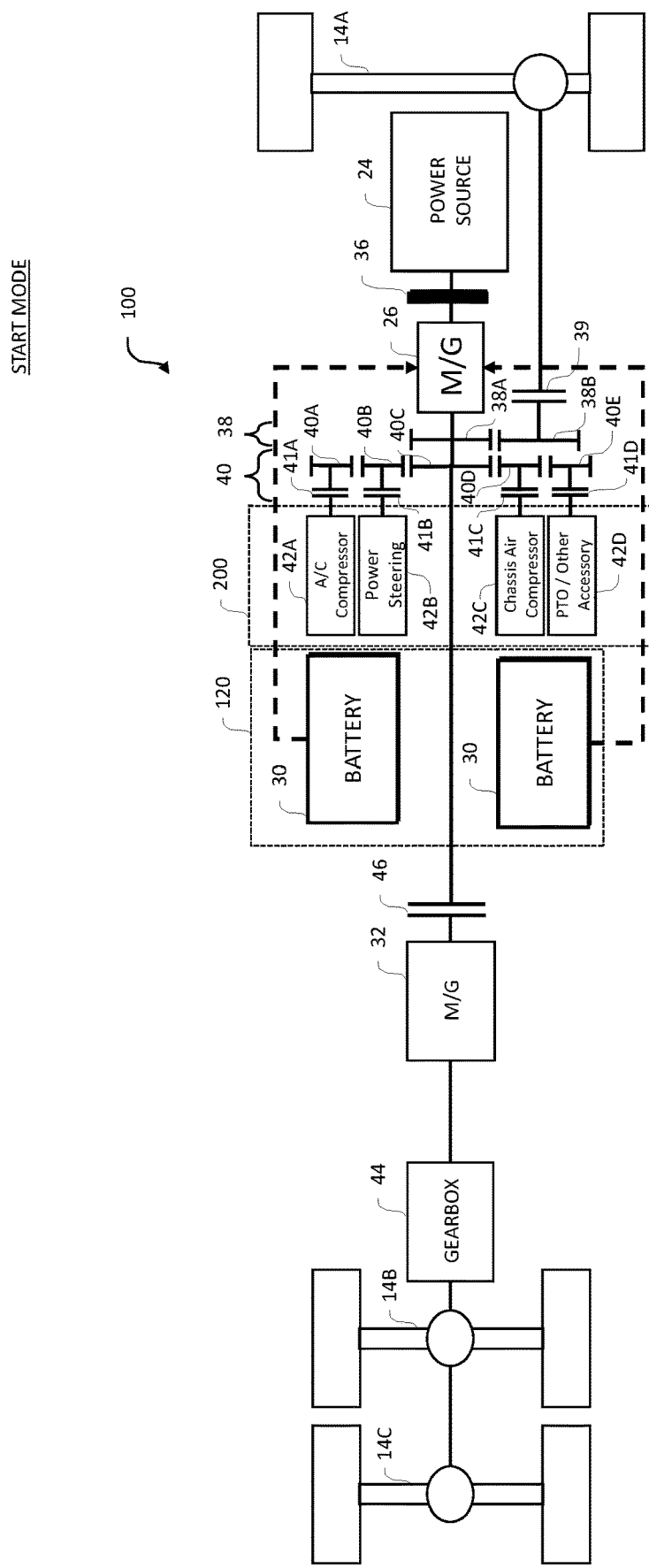
FIG. 3 depicts a schematic diagram of the embodiment of the vehicle depicted in FIGS. 1A and 1B in a start mode configuration.

In some embodiments, a decontented power source 24 coupled to M/G 26 may be easier to start. Referring to FIG. 3, embodiments may comprise a controller (not shown) communicatively coupled to power source 24, clutches 36, 39 and 46, battery system 120 comprising one or more batteries 30, motor/generators 26 and 32. Embodiments may start power source 24 by operating M/G 26 as a motor. In a start mode, power source 24 may be off and clutch 36 may be closed (indicated by a solid black box) to engage M/G 26 to power source 24. One or more batteries 30 in battery system 120 may supply electric power (indicated by heavy dashed lines) to M/G 26 which functions as a motor (e.g., a starter motor) to start power source 24.

As depicted in FIG. 3, clutches 39 and 46 may be open (indicated by parallel lines), to disengage front axle 14A from M/G 26 and disengage axles 14B and 14C from M/G 32, resulting in no rotational power being supplied to front axle 14A or rear axles 14B or 14C. Clutches 41A-41D may be open such that no rotational power is supplied to accessories 42A-42D. The configuration depicted in FIG. 3 with clutches 39 and 46 in an open position enables battery system 120 and M/G 26 to start power source 24 while vehicle 10 is stopped or moving. Elimination of a starter motor may reduce the overall size associated with power source 24 and may simplify installation and removal of power source 24 from engine compartment 22.

Battery Charge Mode

Vehicle 10 may be configured with power source 24 coupled to M/G 26 such that power source 24 is used to generate electric power only.

Figure 4:
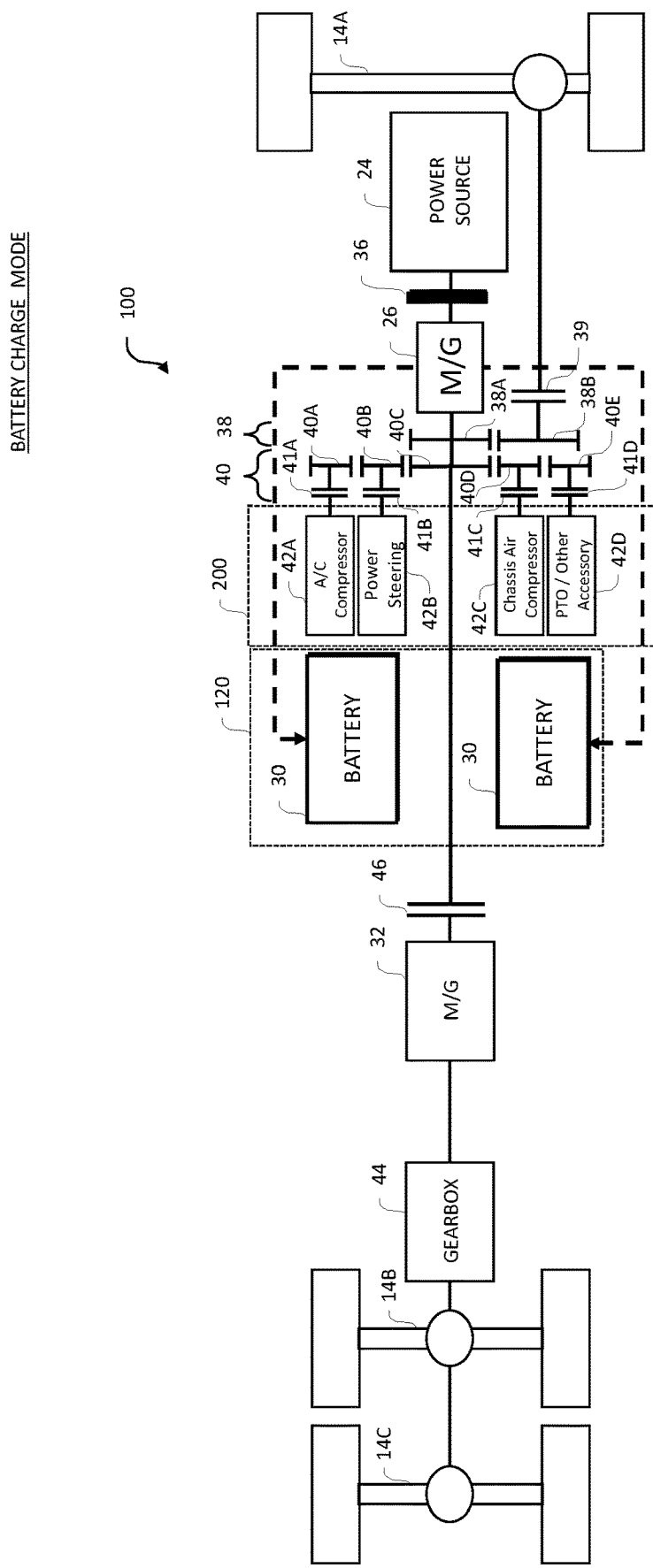
FIG. 4 depicts a schematic diagram of the embodiment of the vehicle depicted in FIGS. 1A and 1B in a battery charging mode configuration.

Referring to FIG. 4, embodiments may comprise a controller (not shown) communicatively coupled to power source 24, clutches 36, 39 and 46, battery system 120 comprising one or more batteries 30, motor/generators 26 and 32. Power source 24 may be on and clutch 36 may be closed (indicated by a solid black box) to engage power source 24 to M/G 26. A controller may cause power source 24 to supply rotational power to M/G 26 functioning as a generator to supply electric power (indicated by heavy dashed lines) to charge battery 30.

As depicted in FIG. 4, clutches 39 and 46 may be open (indicated by parallel lines), such that no rotational power generated by M/G 26 is supplied to front axle 14A or one or more rear axles 14B or 14C. Clutches 41A-41D may be open such that no rotational power generated by M/G 26 is supplied to accessories 42A-42D. The configuration depicted in FIG. 4 may enable power source 24 to charge battery system 30 when vehicle 10 is parked or idle.

Driving Modes

FIGS. 5A-5J depict configurations of vehicle 10 configured with rotational power transmitted through one or more axles 14 of a plurality of axles.

Power Source Used to Drive Vehicle and Charge Batteries

Figure 5A:
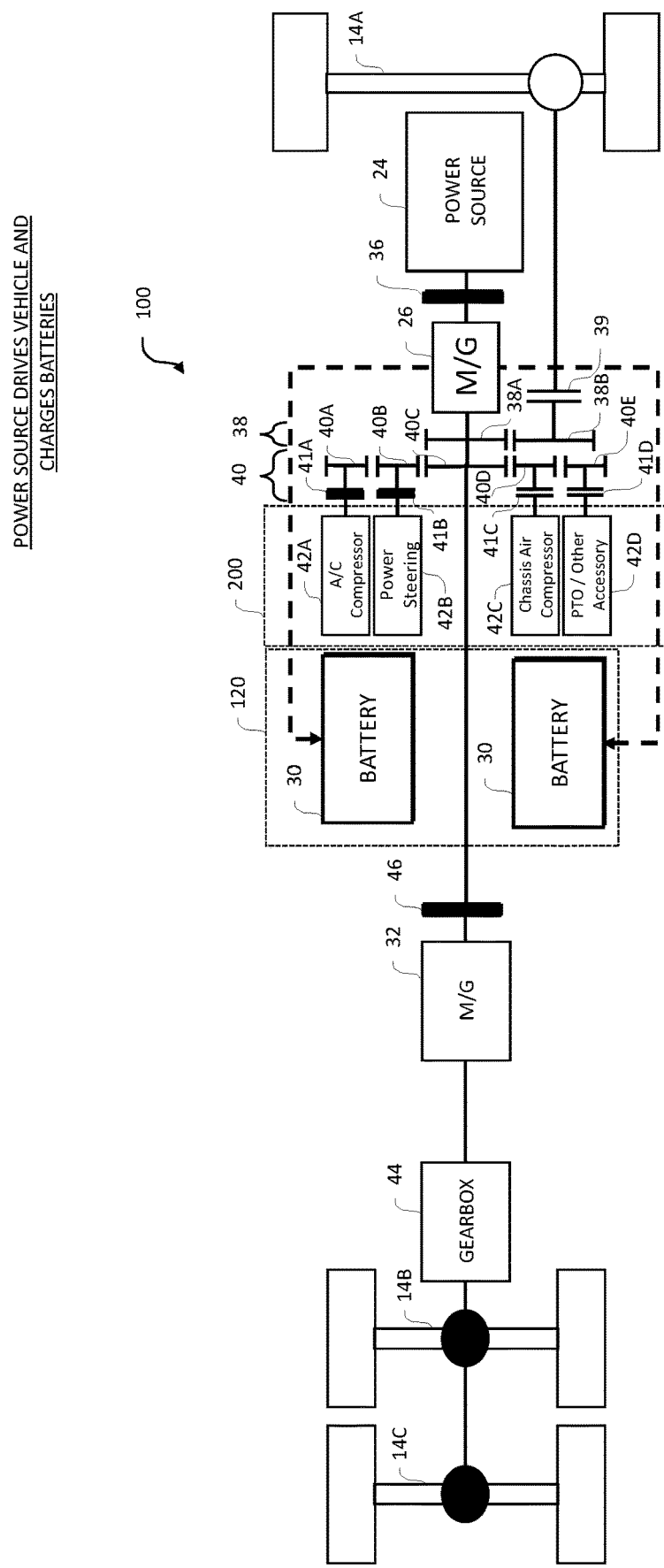
FIGS. 5A-5J depict schematic diagrams of the embodiment of the vehicle depicted in FIG. 2 in driving configurations.

Referring to FIG. 5A, in some embodiments, drive train 100 may be configured with power source 24 supplying rotational power to drive vehicle 10 and charge one or more batteries 30 in battery system 120. In some embodiments, clutch 36 may be closed to engage power source 24 to M/G 26 and clutch 46 may be closed to engage M/G 26 to gear box 44. In these embodiments, power source 24 may supply rotational power to one or more of rear axles 14B and 14C to drive vehicle 10 and may supply rotational power to M/G 26 functioning as a generator to generate electric power (indicated by heavy dashed lines) to charge battery 30. Rotational power from M/G 26 may be transmitted to accessory gear pass 40 for operating one or more accessories 42. For example, as depicted in FIG. 5A, clutches 41A and 41B may be closed to engage accessories A/C compressor 42A and power steering pump 42B with accessory gear pass 40 (gear 40A and gear 40B) such that rotational power is supplied to A/C compressor 42A through clutch 41A and supplied to power steering pump 42B through clutch 41B.

Vehicle 10 in the configuration depicted in FIG. 5A may represent a configuration in which a controller (not shown) signals power source 24 to supply rotational power, signals clutch 46 to engage rear axles 14B and 14C such that rotational power is supplied to one or more of rear axles 14B and 14C, signals clutch 36 to engage accessory gear pass 40 to supply rotational power to M/G 26 to charge one or more batteries 30 in battery system 120 and operates portions of thermal management system 200. Thermal management system 200 may include A/C compressor 42A as part of a refrigerant system configured to maintain an operating temperature of one or more batteries 30 in battery system 120 within a range of operating temperatures and also configured to maintain a desired temperature inside cab 16 for a driver. Clutches 41C and 41D may be closed as needed to engage chassis air compressor 42C and/or Power Take-Off (PTO) or other accessory 42D.

Batteries Used to Drive Vehicle

Figure 5B:
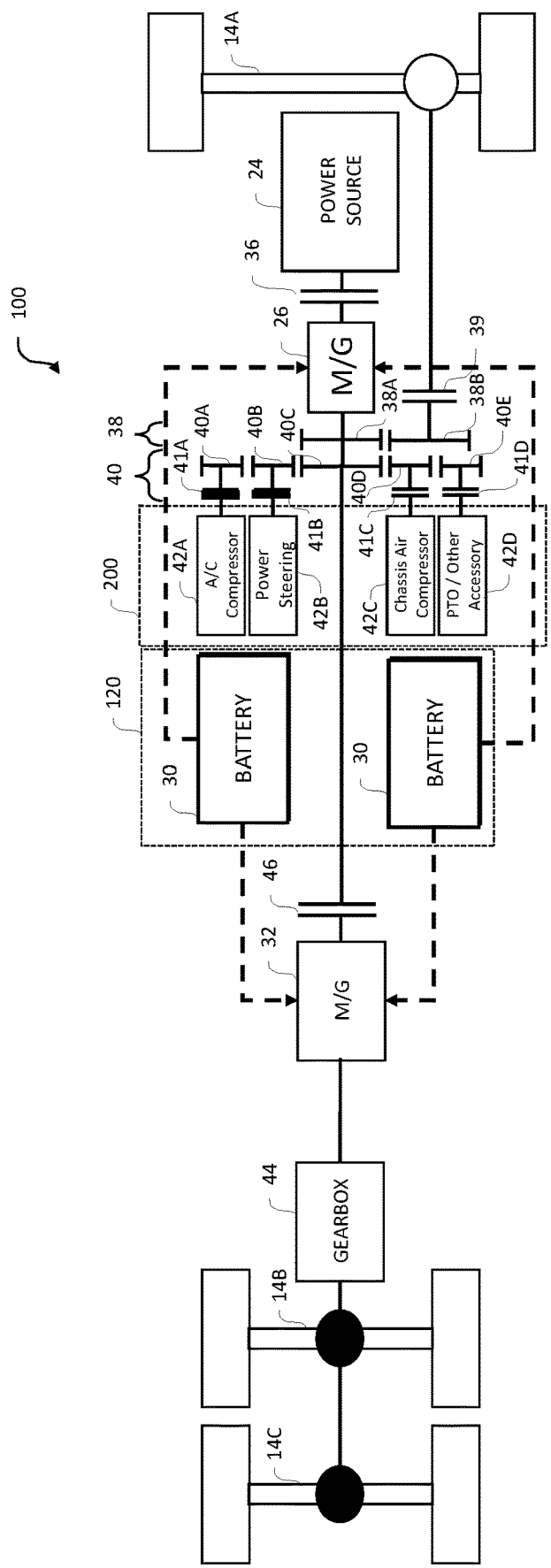

Referring to FIG. 5B, in some embodiments, drive train 100 may be configured with M/G 26 disengaged from power source 24 such that one or more batteries 30 in battery system 120 supply electric power to M/G 32 operating as a motor to supply rotational power to one or more rear axles 14B and 14C to drive vehicle 10 and supply electric power to M/G 26 operating as a motor to supply rotational power to gear pass 40 to operate accessories 42. A controller (not shown) may signal battery system 120 to supply electric power to M/G 32, signal M/G 32 to operate as a motor to generate rotational power and signal clutch 46 to open, wherein rotational power generated by M/G/32 is transmitted through gear box 44 to one or more of rear axles 14B and 14C to drive vehicle 10. The controller may signal battery system 120 to supply electric power to M/G 26 configured as a motor to generate rotational power, signal clutch 36 to close to engage accessory gear pass 40 such that rotational power is supplied to accessory gear pass 40 for operating one or more accessories 42A-42D. For example, as depicted in FIG. 5B, clutches 41A and 41B may be closed to engage accessories A/C compressor 42A and power steering pump 42B with accessory gear pass 40 (gear 40A and gear 40B) such that rotational power is supplied to A/C compressor 42A through clutch 41A and supplied to power steering pump 42B through clutch 41B.

The configuration depicted in FIG. 5B may represent a configuration of vehicle 10 in which battery system 120 supplies all power to drive vehicle 10 and operate accessories 42A-42D including portions of thermal management system 200. Thermal management system 200 may include A/C compressor 42A as part of a refrigerant system configured to maintain an operating temperature of batteries 30 in battery system 120 within a range of operating temperatures and configured to maintain a desired temperature inside cab 16 for a driver. Although not depicted in FIG. 5B, clutches 41C and 41D may be closed to engage chassis air compressor 42C and/or Power Take-Off (PTO) or other accessory 42D with accessory gear pass 40 (gear 40D and gear 40E) such that rotational power is supplied to air compressor 42C through clutch 41C and supplied to Power Take-Off (PTO) 42D through clutch 41D.

Battery Mode with Two Motors

Figure 5C:
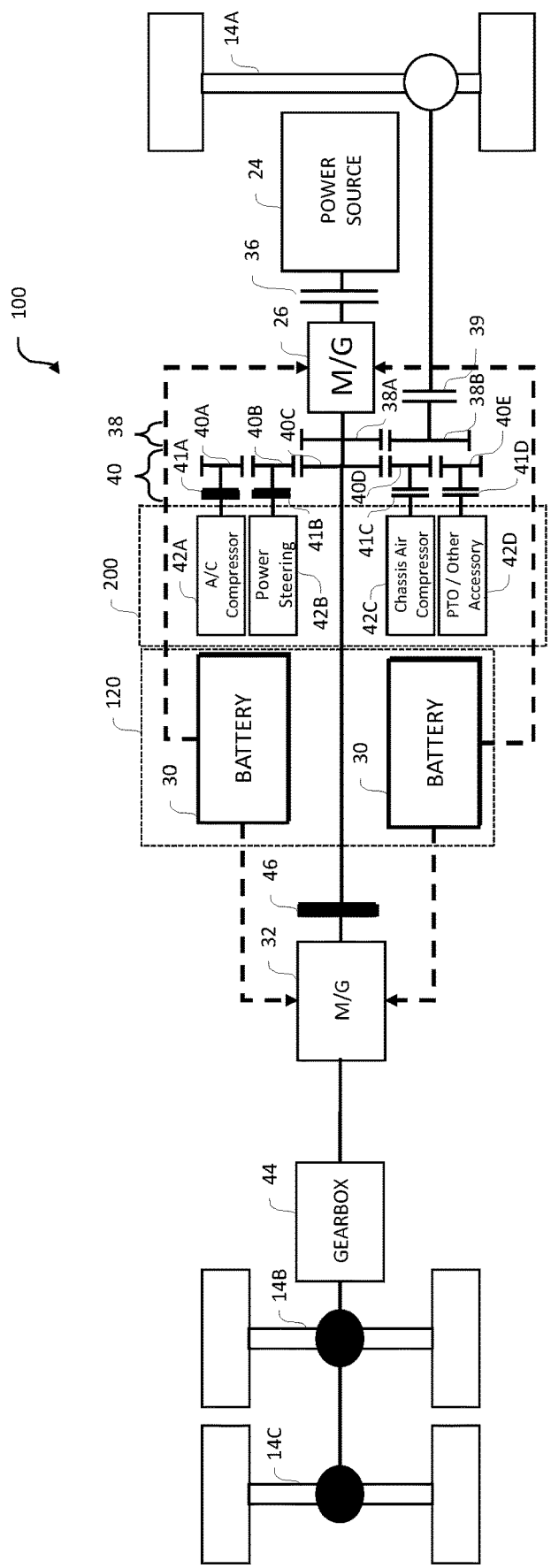

Referring to FIG. 5C, in some embodiments, drive train 100 may be configured with M/G 26 disengaged from power source 24 such that battery system 120 supplies electric power to M/G 32 and M/G 26 to drive vehicle 10 and supply electric power to M/G 26 to operate accessories 42A-42D. A controller (not shown) may signal batteries 30 to supply electric power to M/G 32 operating as a motor to generate rotational power, wherein rotational power generated by M/G/32 is supplied through gear box 44 to one or more of rear axles 14B and 14C to drive vehicle 10. Furthermore, clutch 46 may be closed to engage M/G 26 to gear box 44. The controller may signal battery system 120 to supply electric power to M/G 26 and signal M/G 26 to operate as a motor to supply additional rotational power to gear box 44 and supply rotational power to accessory gear pass 40 for supplying rotational power to accessory gear pass 40 for operating one or more accessories 42. For example, as depicted in FIG. 5C, clutches 41A and 41B may be closed to engage accessories A/C compressor 42A and power steering pump 42B with accessory gear pass 40 (gear 40A and gear 40B) such that rotational power is supplied to A/C compressor 42A through clutch 41A and supplied to power steering pump 42B through clutch 41B.

The configuration depicted in FIG. 5C may represent a configuration of vehicle 10 in which battery 30 supplies power to two motors to drive vehicle 10 and operate accessories 42A-42D including portions of thermal management system 200. Thermal management system 200 may include A/C compressor 42A as part of a refrigerant system configurable to maintain an operating temperature of battery 30 within a range of operating temperatures and may also maintain a desired temperature inside cab 16 for a driver. Although not depicted in FIG. 5B, clutches 41C and 41D may be closed to engage chassis air compressor 42C and/or Power Take-Off (PTO) or other accessory 42D with accessory gear pass 40 (gear 40D and gear 40E) such that rotational power is supplied to air compressor 42C through clutch 41C and supplied to Power Take-Off (PTO) 42D through clutch 41D.

Maximum Power

Figure 5D:
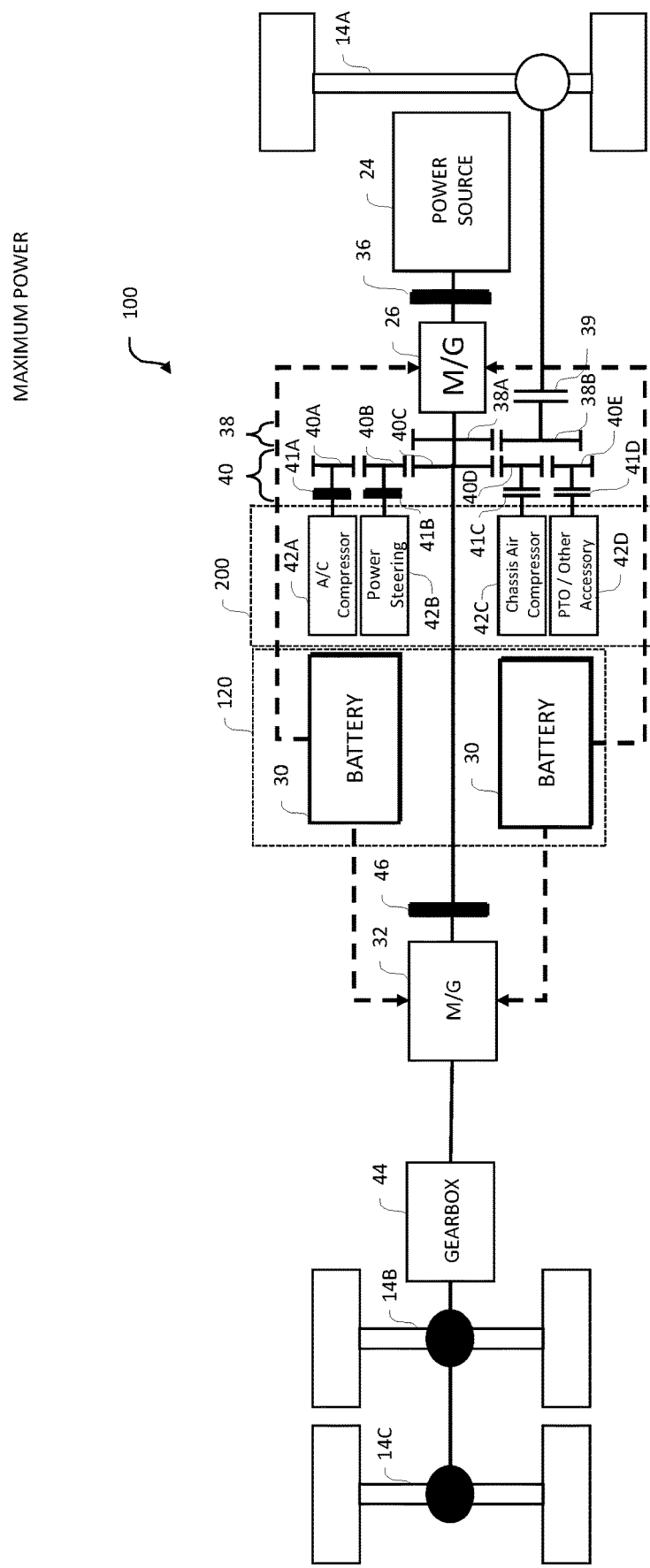

Referring to FIG. 5D, in some embodiments, drive train 100 may be configured with clutch 36 closed to engage power source 24 to M/G 26 and clutch 46 closed to engage power source 24 to one or more of rear axles 14B and 14C and battery system 120 configured to supply electric power to one or both of M/G 32 and M/G 26 to drive vehicle 10. A controller (not shown) may signal power source 24 to operate and signal clutch 36 to close such that rotational power from power source 24 is supplied to M/G 26 and battery system 120 supplies electric power to M/G 32 and M/G 26 to generate rotational power. The controller may signal clutch 46 to close to engage M/G 26 to gear box 44, wherein rotational power supplied by power source 24 and generated by M/G 26 and M/G 32 may be transmitted through gear box 44 to rear axles 14B and 14C to drive vehicle 10. M/G 26 operating as a motor may supply rotational power to accessory gear pass 40 for operating one or more accessories 42A-42D. For example, as depicted in FIG. 5D, clutches 41A and 41B may be closed to engage accessories A/C compressor 42A and power steering pump 42B with accessory gear pass 40 (gear 40A and gear 40B) such that rotational power is supplied to A/C compressor 42A through clutch 41A and supplied to power steering pump 42B through clutch 41B.

The configuration depicted in FIG. 5D may represent a configuration of vehicle 10 in which power source 24, M/G 26 and M/G 32 supply power to drive vehicle 10 and operate accessories 42A-42D including portions of thermal management system 200. Thermal management system 200 may include A/C compressor 42A as part of a refrigerant system configured to maintain an operating temperature of one or more batteries 30 in battery system 120 within a range of operating temperatures and also configured to maintain a desired temperature inside cab 16 for a driver. Clutches 41C and 41D may be closed as needed to operate chassis air compressor 42C and/or Power Take-Off (PTO) or other accessory 42D.

All-Wheel Power

Vehicle 10 may operate in various regions or industries in which power to two or more axles may be desirable or even necessary. For example, vehicle 10 may operate in areas with unimproved roads or areas with mud, gravel, sand or uneven terrain, where the ability to supply power to multiple axles or wheels may be needed to prevent vehicle 10 from getting stuck. In some embodiments, vehicle 10 may be configured to allow power source 24 to be coupled to front axle 14A to provide supplemental power for driving vehicle 10 or to increase powertrain efficiency or reduce power train loss.

Figure 5E:
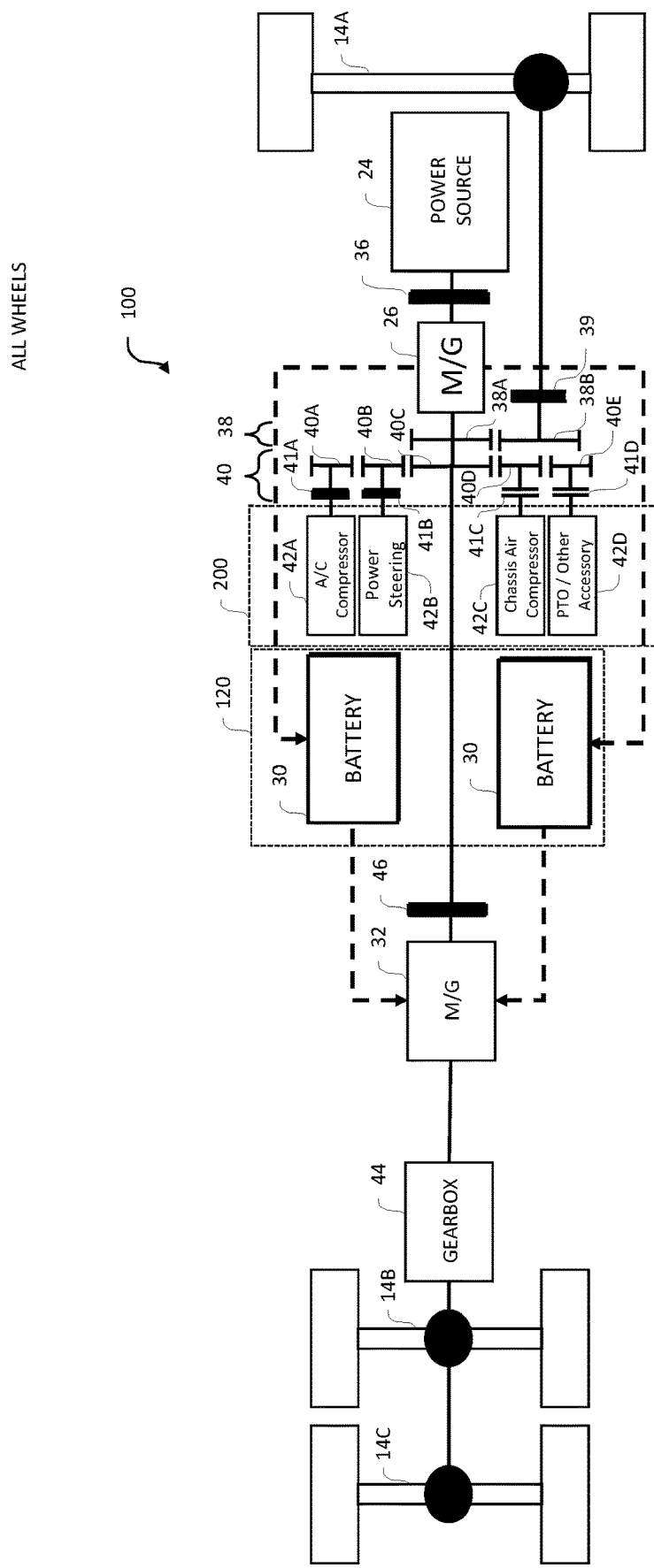

Referring to FIG. 5E, in some embodiments, drive train 100 may be configured with power source 24 coupled to M/G 26 and battery system 120 supplying electric power to M/G 32 and M/G 26 to drive all axles 14 on vehicle 10. A controller (not shown) may signal clutch 36 to close to engage power source 24 to M/G 26. The controller may signal battery system 120 to supply electric power to M/G 32 and M/G 26 to generate rotational power. The controller may signal clutch 46 to close to engage M/G 26 to gear box 44, wherein additional rotational power supplied by one or more of power source 24 and M/G 26 may be combined with rotational power supplied by M/G 32 at gear box 44 to supply rotational power to rear axles 14B and 14C to drive vehicle 10.

The controller may signal clutch 39 to close to engage M/G 26 to front axle 14A, wherein rotational power supplied by one or more of power source 24 and M/G 26 may be transmitted through front axle gear pass 38 (38A and 38B) to front axle 14A to drive vehicle 10. The use of front axle 14A may be permanent or selectively engageable, which may include a system controller identifying one or more conditions (e.g., wheel rotation speed disproportionate to vehicle speed, vehicle 10 descending a steep grade when ambient air temperature suggests icy roads are possible) that indicate front axle 14A should be engaged for increased control or safety reasons and closing clutch 39 to engage M/G 26 to front axle 14A.

M/G 26 operating as a motor may supply rotational power to accessory gear pass 40 for operating one or more accessories 42A-42D. For example, as depicted in FIG. 5E, clutches 41A and 41B may be closed to engage accessories A/C compressor 42A and power steering pump 42B with accessory gear pass 40 (gear 40A and gear 40B such that rotational power is supplied to A/C compressor 42A through clutch 41A and supplied to power steering pump 42B through clutch 41B.

The configuration depicted in FIG. 5E may represent a configuration of vehicle 10 in which power source 24, M/G 26 and M/G 32 supply power to all axles 14A-14C to drive vehicle 10 and operate portions of thermal management system 200. Thermal management system 200 may include A/C compressor 42A as part of a refrigerant system configurable to maintain an operating temperature of batteries 30 within a range of operating temperatures and may also maintain a desired temperature inside cab 16 for a driver. Although not depicted in FIG. 5E, clutches 41C and 41D may be closed to engage chassis air compressor 42C and/or Power Take-Off (PTO) or other accessory 42D with accessory gear pass 40 (gear 40D and gear 40E) such that rotational power is supplied to air compressor 42C through clutch 41C and supplied to Power Take-Off (PTO) 42D through clutch 41D.

Battery Bypass

Figure 5F:
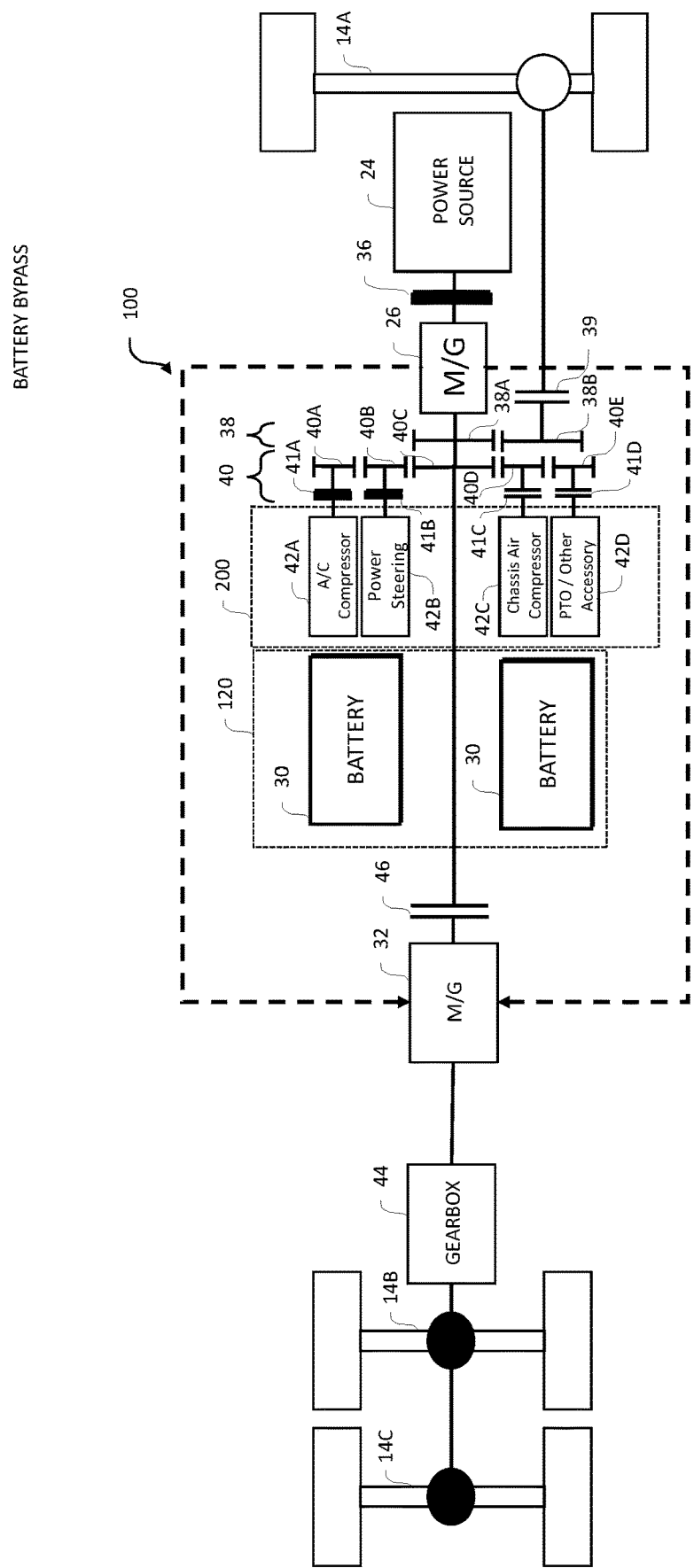

Referring to FIG. 5F, in some embodiments, drive train 100 may be configured with power source 24 coupled to M/G 26 operating as a generator for supplying electric power to M/G 32, wherein battery 30 is neither charged or discharged. A controller (not shown) may signal power source 24 to operate and signal clutch 36 close such that rotational power from power source 24 is supplied to M/G 26. The controller may signal M/G 26 to operate as a generator to supply electric power to M/G 32 to generate rotational power and signal clutch 46 to open, wherein rotational power from M/G 32 is supplied to one or more of rear axles 14B and 14C via gearbox 44 to drive vehicle 10. Rotational power from M/G 26 may be transmitted to accessory gear pass 40 for operating one or more accessories 42A-42D. The controller may signal clutches 41A and 41B to close to engage accessories A/C compressor 42A and power steering pump 42B with accessory gear pass 40 (gear 40A and gear 40B such that rotational power is supplied to A/C compressor 42A through clutch 41A and supplied to power steering pump 42B through clutch 41B.

The configuration depicted in FIG. 5F may represent a configuration of vehicle 10 in which operation of vehicle 10 using battery 30 is undesirable, such as when an operating temperature of battery system 120 is outside a range of desired operating temperatures. Power source 24 may supply rotational power to accessory gear pass 40 for operating one or more accessories 42 as part of thermal management system 200. Thermal management system 200 may include A/C compressor 42A as part of a refrigerant system configurable for maintaining an operating temperature of batteries 30 within a range of operating temperatures and maintaining a desired temperature inside cab 16 for a driver. Although not depicted in FIG. 5F, clutches 41C and 41D may be closed to engage chassis air compressor 42C and/or Power Take-Off (PTO) or other accessory 42D with accessory gear pass 40 (gear 40D and gear 40E) such that rotational power is supplied to air compressor 42C through clutch 41C and supplied to Power Take-Off (PTO) 42D through clutch 41D.

Basic Regeneration Mode

Figure 5G:
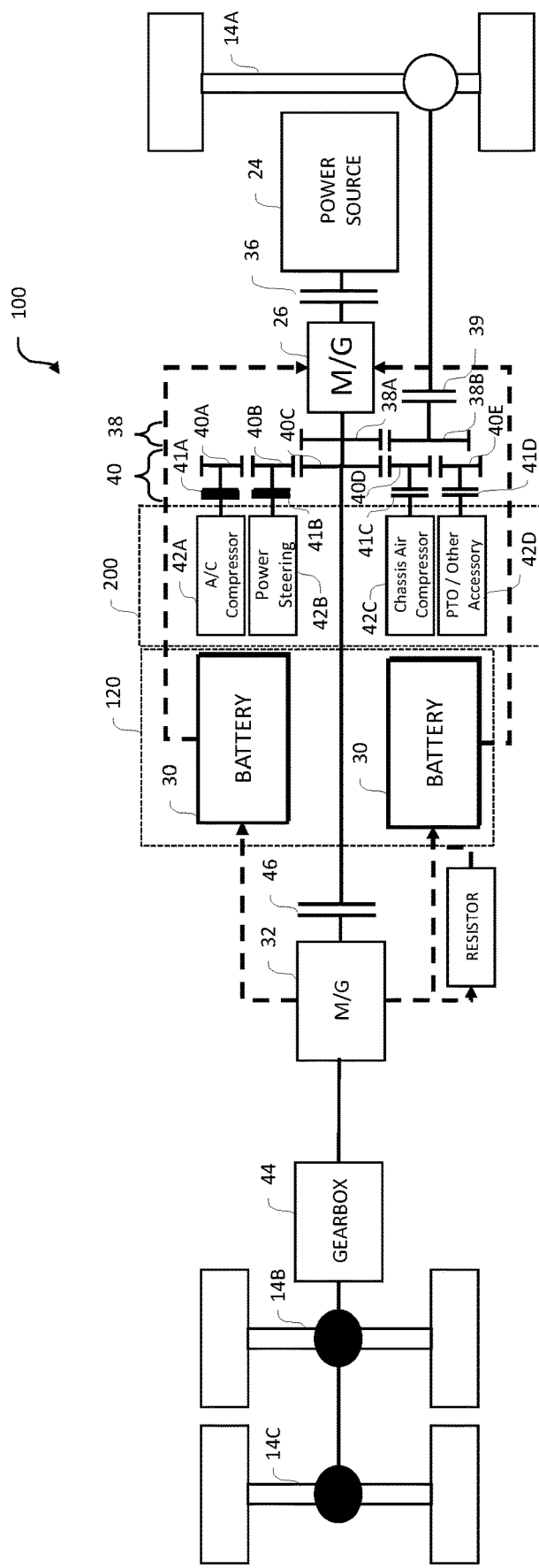

Referring to FIG. 5G, in some embodiments, drive train 100 may be configured with power source 24 disengaged from M/G 26 and M/G 32 operating as a generator for generating electric power to charge battery 30. For example, when vehicle 10 is driving downhill or a driver is applying slight pressure on brakes to slow vehicle 10, rotational power from one or more of rear axles 14B and 14C may be supplied to M/G 32 operating as a generator to charge one or more batteries 30 in battery system 120. In some embodiments, a controller (not shown) may signal clutch 36 to open to disengage M/G 26 from power source 24. In some embodiments, the controller may signal clutch 46 to open, wherein vehicle 10 rotates rear axles 14A, 14B coupled to M/G 32, which causes M/G 32 to generate electric power to charge one or more batteries 30 in battery system 120. The controller may signal battery system 120 to supply electric power to M/G 26 and signal M/G 26 to operate as a motor to generate rotational power transmitted to accessory gear pass 40 for operating one or more accessories 42. For example, as depicted in FIG. 5G, clutches 41A and 41B may be closed to engage accessories A/C compressor 42A and power steering pump 42B with accessory gear pass 40 (gear 40A and gear 40B) such that rotational power is supplied to A/C compressor 42A through clutch 41A and supplied to power steering pump 42B through clutch 41B. The configuration depicted in FIG. 5G may use M/G 32 to convert rotational power from one or more of rear axles 14B and 14C to charge battery system 120 with minimal braking effect on vehicle 10 while producing zero emissions and less noise and may reduce wear on mechanical braking systems.

The configuration depicted in FIG. 5G may represent a configuration of vehicle 10 in which vehicle 10 is coasting or otherwise requires no rotational power input to axles 14A-14C, such as when vehicle 10 is driving down a slight incline. Rotational power from one or more of rear axles 14B and 14C rotates M/G 32 operating as a generator to charge battery 30. In some embodiments, battery system 120 may supply electric power to M/G 26 operating as a motor to generate rotational power transmitted to accessory gear pass 40 for operating one or more accessories 42A-42D as part of thermal management system 200. Thermal management system 200 may include A/C compressor 42A as part of a refrigerant system configurable for maintaining an operating temperature of battery system 120 within a range of operating temperatures and maintaining a desired temperature inside cab 16 for a driver. Although not depicted in FIG. 5G, clutches 41C and 41D may be closed to engage chassis air compressor 42C and/or Power Take-Off (PTO) or other accessory 42D with accessory gear pass 40 (gear 40D and gear 40E) such that rotational power is supplied to air compressor 42C through clutch 41C and supplied to Power Take-Off (PTO) 42D through clutch 41D.

High Regeneration Mode

Figure 5H:
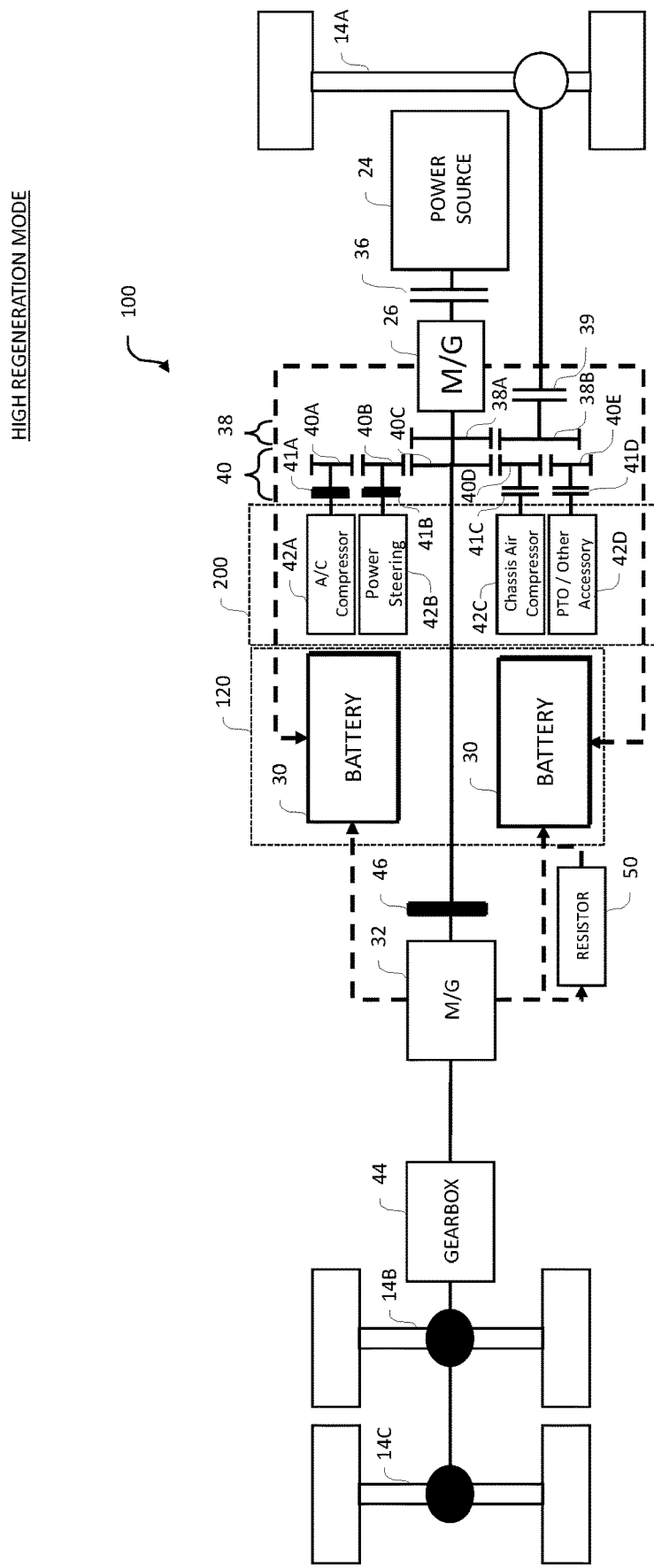

Referring to FIG. 5H, in some embodiments, drive train 100 may be configured with both M/G 26 and M/G 32 operating as generators for generating electric power to charge battery system 120 and providing resistance to slow vehicle 10. For example, when vehicle 10 is driving downhill on a steeper incline, a driver may require a greater brake force to slow vehicle 10. In these conditions, using only M/G 32 for regenerative braking may be insufficient to slow vehicle 10. In some embodiments, a controller (not shown) may signal clutch 46 to close to engage both rear axles 14B and 14C to M/G 26, wherein rotational power supplied by rear axles 14B, 14C causes M/G 32 and M/G 26 to generate electric power to charge battery system 120. In some embodiments, the controller may signal clutch 46 to close such that rotational power supplied by rear axles 14B, 14C is supplied to gear 40C in accessory gear pass 40, wherein rotational power may be supplied to one or more accessories 42A-42C. For example, as depicted in FIG. 5H, clutches 41A and 41B may be closed such that rotational power is supplied to A/C compressor 42A through clutch 41A and supplied to power steering pump 42B through clutch 41B. In some embodiments, clutch 46 may be closed to engage rear axles 14B and 14C such that rotational power from axles 14B, 14C is supplied to gear 40C in accessory gear pass 40, wherein rotational power may be supplied to one or more accessories 42 as part of thermal management system 200. Thermal management system 200 may include A/C compressor 42A as part of a refrigerant system configurable for maintaining an operating temperature of battery system 120 within a range of operating temperatures and maintaining a desired temperature inside cab 16 for a driver. Although not depicted in FIG. 5H, clutches 41C and 41D may be closed to engage chassis air compressor 42C and/or Power Take-Off (PTO) or other accessory 42D with accessory gear pass 40 (gear 40D and gear 40E) such that rotational power is supplied to air compressor 42C through clutch 41C and supplied to Power Take-Off (PTO) 42D through clutch 41D.

The configuration depicted in FIG. 5H may use M/G 32 and M/G 26 to charge battery system 120 and provide additional resistance for slowing vehicle 10 while producing zero emissions and less noise and may reduce wear on mechanical braking systems. For example, the configuration depicted in FIG. 5H may represent a configuration of vehicle 10 in which vehicle 10 is driving down a steeper incline or a driver has required a greater brake force to slow vehicle 10. Rotational power from rear axles 14B and 14C rotates M/G 32 and M/G 26 operating as generators to charge battery 30, wherein both M/G 26 and M/G 32 provide resistance for slowing vehicle 10.

Vehicle 10 may switch between the configurations depicted in FIGS. 5G and 5H. In some embodiments, when vehicle 10 is driving below a speed threshold, drive train 100 may be configured to operate as depicted in FIG. 5G and when vehicle 10 is driving above the speed threshold, drive train 100 may be configured to operate as depicted in FIG. 5H. The speed threshold may depend on the weight of vehicle 10, the speed of vehicle 10, the grade of a road that vehicle 10 is on, or some other factor.

Regeneration Mode with Engine Braking

Figure 5I:
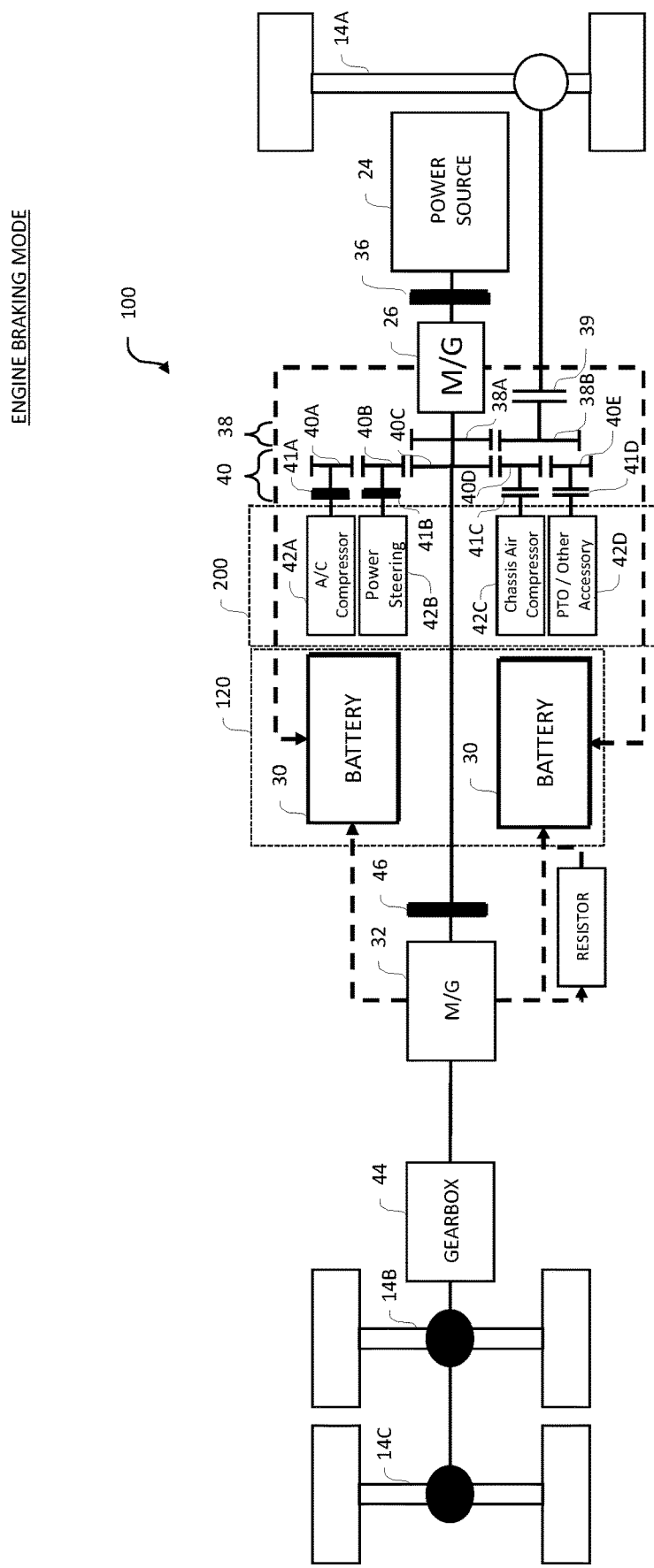

Referring to FIG. 5I, in some embodiments, drive train 100 may be configured with both M/G 26 and M/G 32 operating as generators for generating electric power to charge battery system 120 and provide resistance for slowing vehicle 10 and may also use the internal resistance of power source 24 to slow vehicle 10. For example, vehicle 10 may be driving downhill on a very steep incline and/or has a heavy payload and a driver may require a large brake force to slow vehicle 10. In these conditions, using only M/G 32 and M/G 26 for regenerative braking may be insufficient to slow vehicle 10. In some embodiments, a controller (not shown) may signal clutch 46 to close to engage rear axles 14B, 14C to M/G 26, wherein rotational power supplied by rear axles 14B, 14C causes M/G 26 to generate electric power to charge one or more batteries 30 in battery system 120. Clutch 46 may be closed to couple M/G 26 to gear box 44 and M/G 26 may operate as a generator to charge batteries 30. Clutch 36 may be closed to engage M/G 26 to power source 24 such that rotational power transmitted from rear axles 14B and 14C through M/G 26 is resisted by power source 24 (also referred to as engine braking). Rotational power generated by axles 14B, 14C may be transmitted to accessory gear pass 40 for operating one or more accessories 42. For example, as depicted in FIG. 5I, clutches 41A and 41B may be closed to transmit rotational power to A/C compressor 42A through clutch 41A and transmit rotational power to power steering pump 42B through clutch 41B. In some embodiments, rotational power generated by axles 14B, 14C may be transmitted to accessory gear pass 40 for operating one or more accessories 42 as part of thermal management system 200. Thermal management system 200 may include A/C compressor 42A as part of a refrigerant system configurable for maintaining an operating temperature of battery system 120 within a range of operating temperatures and maintaining a desired temperature inside cab 16 for a driver. Clutches 41C and 41D may be closed as needed to operate chassis air compressor 42C and/or Power Take-Off (PTO) or other accessory 42D.

The configuration depicted in FIG. 5I may use M/G 32 and M/G 26 to charge battery 30 and use the internal resistance of power source 24, M/G 26 and M/G 32 to slow vehicle 10 while minimizing emissions.

Full Drive Train Braking Mode

Figure 5J:
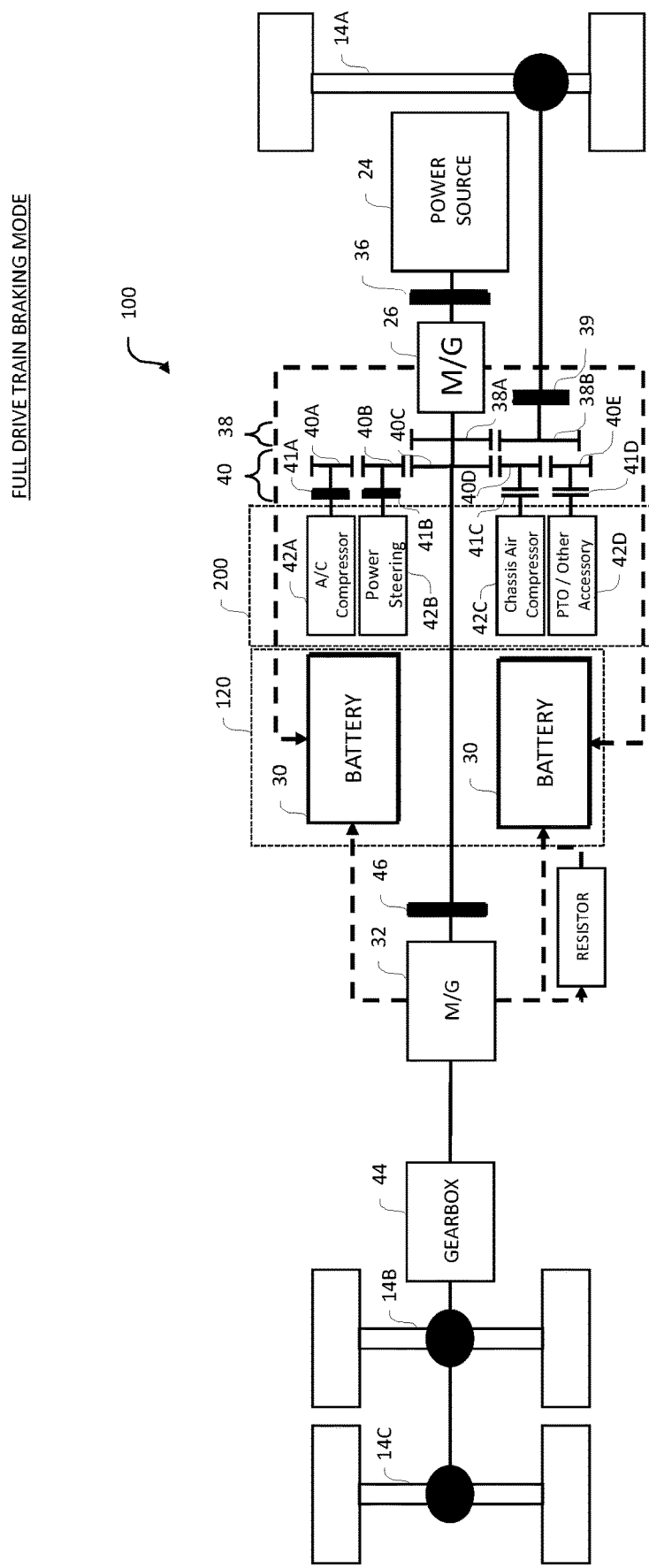

Drive train 100 may be configured to charge battery system 120 and slow vehicle 10. For example, vehicle 10 may be driving downhill on a very steep incline and/or has a heavy payload and a driver may require a large brake force to slow vehicle 10. Referring to FIG. 5J, in some embodiments, a controller (not shown) signal both M/G 26 and M/G 32 to operate as generators for generating electric power to charge battery system 120, may signal clutch 36 to close to engage M/G 26 to power source 24, and may signal clutch 39 to close to M/G 26 to engage front axle 14A.

Rotational power generated by rear axles 14B and 14C may be transmitted to accessory gear pass 40 for operating one or more accessories 42. For example, as depicted in FIG. 5J, clutches 41A and 41B may be closed to transmit rotational power to A/C compressor 42A through clutch 41A and transmit rotational power to power steering pump 42B through clutch 41B. In some embodiments, rotational power generated by axles 14B, 14C may be transmitted to accessory gear pass 40 for operating one or more accessories 42 as part of thermal management system 200. Thermal management system 200 may include A/C compressor 42A as part of a refrigerant system configurable for maintaining an operating temperature of battery system 120 within a range of operating temperatures and maintaining a desired temperature inside cab 16 for a driver. Although not depicted in FIG. 5J, clutches 41C and 41D may be closed to engage chassis air compressor 42C and/or Power Take-Off (PTO) or other accessory 42D with accessory gear pass 40 (gear 40D and gear 40E) such that rotational power is supplied to air compressor 42C through clutch 41C and supplied to Power Take-Off (PTO) 42D through clutch 41D.

The configuration depicted in FIG. 5J may use M/G 32 and M/G 26 to charge battery system 120 and use the internal resistance of power source 24, M/G 26, M/G 32 and front axle 14A to slow vehicle 10 while minimizing emissions.

Figure 6:
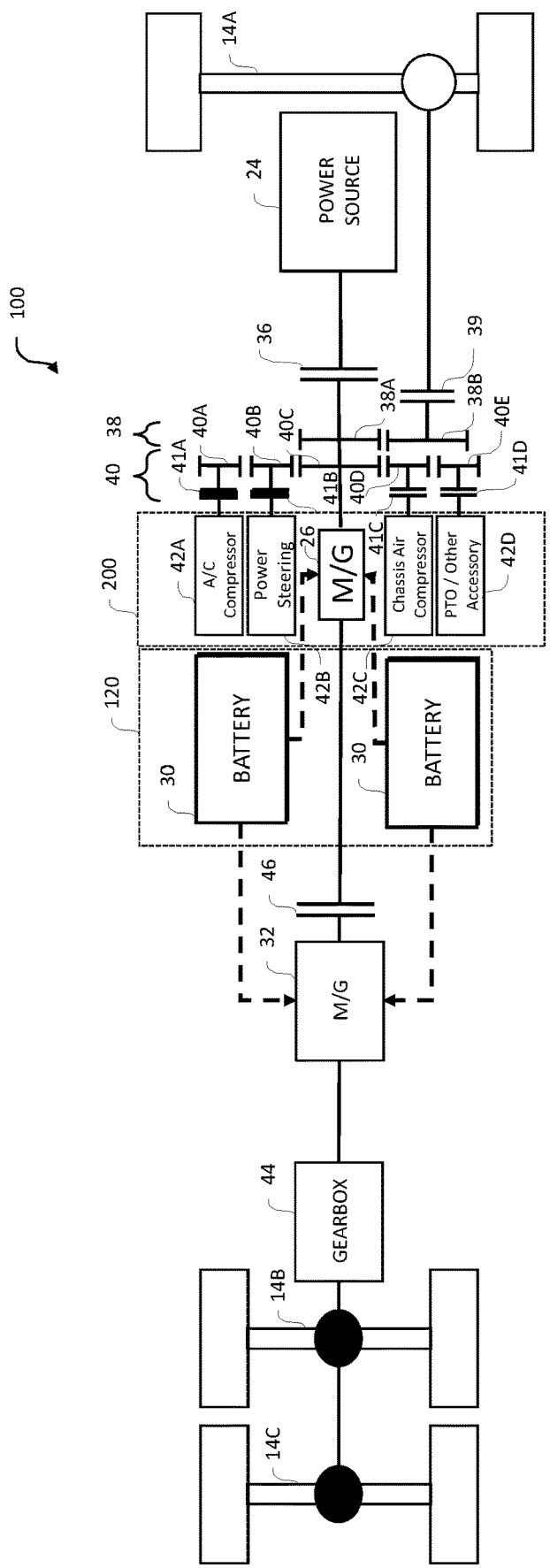
FIG. 6 depicts a schematic diagram of one embodiment of the vehicle depicted in FIGS. 1A and 1B.

Variations of embodiments described above may operate similarly. For example, FIGS. 5B and 6 depict embodiments of drive train 100 configured with M/G 26 disengaged from power source 24 such that battery 30 supplies electric power to M/G 32 to drive vehicle 10 and supplies electric power to M/G 26 to operate accessories 42. FIG. 5B depicts M/G 26 located upstream of accessory gear pass 40, whereas FIG. 6 depicts M/G 26 located downstream of accessory gear pass 40. The location of M/G 26 upstream or downstream of accessory gear pass 40 may be selected for packaging purposes. For example, in some embodiments, power source 24, M/G 26 and clutch 36 may be integrated into a single unit in engine compartment 22, which may result in M/G 26 being located upstream of accessory gear pass 40. As depicted in FIG. 6, M/G 26 located downstream of accessory gear pass 40 and front end gear pass 38 may correspond to power source 24 being a decontented engine for positioning in a smaller compartment.

Battery Management System

A battery management system facilitates vehicle 10 operating under a range of environmental, economic and regulatory conditions. A battery management system (BMS) may control when battery system 120 should transmit electric power to M/G 26 and M/G 32, may determine when M/G 26 and M/G 32 should operate as generators to charge battery system 120, and may determine when to operate power source 24 to charge battery system 120.

In some embodiments, vehicle 10 configured with a BMS may anticipate future power needs and operate power source 24 to charge battery 30 or adjust an operating temperature of battery 30, discussed below in more detail.

In some embodiments, a system controller may determine a weight of vehicle 10. Determining a weight of vehicle 10 may include a system controller determining if a trailer is coupled to vehicle 10, receiving an input from a driver, or communicating over a network with a weigh station or other external source to receive a vehicle weight. Determining a weight of vehicle 10 may comprise a system controller indirectly determining the weight, such as by determining a load on power source 24, determining a fuel consumption rate by power source 24, determining a discharge rate of batteries 30, or determining a temperature increase of batteries 30. In some embodiments, a system controller may compare weight estimations against information input from a driver or received from a weigh station or other external source to calibrate sensors or determine when maintenance is needed.

Information associated with the weight of vehicle 10 may be used to manage the operating temperature and performance of battery system 120 and power source 24. For example, a system controller may determine that the weight of vehicle 10 is at or near a maximum weight and calculate, based on the maximum weight, how much power is needed to move vehicle 10 on a highway at a desired speed. In some embodiments, a system controller may determine a weight of vehicle 10 and calculate how much energy may be regenerated using a regenerative braking system. In some embodiments, a system controller may determine the weight of vehicle 10, analyze the route or terrain, and determine when to charge battery system 120 or if power source 24 or M/G 26 is needed to supply additional rotational power to assist M/G 32. In some embodiments, a system controller may determine the weight of vehicle 10, analyze the route or terrain, and determine how much regenerative power is available to charge battery 30 including coast down charging. In some embodiments, a system controller may receive an input from a driver or communicate over a network with a server to identify a route and charge battery 30 based on the route, including terrain on the route. In some embodiments, a system controller analyzes topographical data and adjusts the performance, the state of charge (SOC) and the operating temperature of battery system 120 and/or the performance of power source 24 based on the topographical data.

A system controller may also monitor system performance to determine component performance. For example, a system controller may analyze power compared with vehicle speed to determine an efficiency of M/G 26, M/G 32 or power source 24. Information may be used to determine when to service vehicle 10 including when to service power source 24, M/G 26, M/G 32, battery system 120, axles 14, a refrigerant system or a coolant system. In some embodiments, a system controller may determine an ambient air temperature and calculate how much power vehicle 10 will need to cool battery 30 below a threshold level based on the ambient air temperature. Information may be stored in a memory on vehicle 10 or communicated using a network to a main server for predicting maintenance needs.

Operation of Power Source Based on Environmental Conditions

A battery management system (BMS) may monitor ambient conditions and control when charging can occur and may communicate with a driver when to plug in to a charging port, when to operate power source 24 and when to supply electric power using battery system 120. In some embodiments, if the ambient air temperature is below a minimum temperature such that battery system 120 performs poorly or below a minimum threshold, a BMS may configure vehicle 10 such that heat is added to battery system 120 to maintain an operating temperature of battery system 120 above a minimum temperature threshold. In some embodiments, a system controller may monitor the operating temperature of battery system 120 and turn on power source 24 to produce heat for battery system 120. In some embodiments, a system controller may determine vehicle 10 is in a high pollution area and operate on battery power or manage how or when power source 24 is used to charge battery system 120 based on pollution levels.

Operation of Power Source Based on Economic Conditions

A battery management system may communicate performance characteristics of battery system 120 and a system controller may determine conditions when it is cheaper to plug vehicle 10 into an external port and when it is cheaper to operate power source 24 to charge battery system 120. In some embodiments, a system controller may be wirelessly coupled to a network and configured to communicate with one or more servers that identify locations with ports that vehicle 10 can connect to for externally charging battery system 120. In some embodiments, a system controller may receive information that may be presented to a driver that instructs the driver what location or vendor to use or instructs the driver to utilize power source 24 to charge battery system 120 and use power source 24 and/or battery system 120 to supply electric power to accessories 42 and subsystems on vehicle 10. In some embodiments, a system controller may communicate over a network to identify a station with a low fuel cost and configure drive train 100 to operate power source 24 to charge battery system 120 before arriving at the station such that more fuel can be purchased at the cheaper rate or maximum range can be obtained by charging battery system 30 immediately before filling vehicle 10 with fuel. In some embodiments, a system controller may communicate with a station an intent to refuel at the station. In the case of CNG or hydrogen fuel stations, communicating with the station an estimated time of arrival and an estimated amount of fuel may allow the station to prefill tanks to reduce the refill time and reduce peak pump consumption at the station. In some embodiments, a system controller may communicate over a network to identify a station with a low electricity cost and configure drive train 100 to transmit electric power from battery system 120 to M/G 32 to drive vehicle 10 such that battery system 120 has a lower SOC but may be charged with electricity supplied by the station at the cheaper rate.

Operation of Power Source Based on Regulatory Conditions

An increasing number of cities and urban areas are transitioning to zero-emission zones that either prohibit vehicles that emit greenhouse gasses or limit the size or type of power sources 24 that can be used in a vehicle. In some embodiments, a battery management system (BMS) ensures battery system 120 has a minimum SOC to complete a route in the zero-emission zone. In some embodiments, a system controller may determine that vehicle 10 is going to operate in a zero-emission zone and signals a BMS to configure battery system 120 to provide all power battery system 30, determine one or more of a distance vehicle 10 will travel and a length of time in the zero-emission zone, and determine if the SOC is enough to complete the route. In some embodiments, a BMS may determine the SOC is below a minimum level and signal power source 24 to start in order to increase the SOC of battery system 120. In some embodiments, the BMS may check the fuel level for power source 24 and signal power source 24 to operate long enough so the SOC of battery system 30 reaches a minimum level. In some embodiments, the BMS may check the operating temperature of battery system 120 and signal power source 24 to operate long enough so battery system 120 may be cooled to a lower operating temperature for longer operation. Other regulatory conditions may include quiet zones that restrict sound levels or prohibit engine braking. Depots, terminals and other areas may have rules or guidelines regarding pollution, noise or how long vehicle 10 may operate power source 24 and a system controller may operate (or turn off) power source 24 based on these rules or guidelines.

Thermal Management System

Vehicle 10 may be configured with a system controller for monitoring operating temperatures of vehicle 10 and a temperature inside cab 16. The system controller may receive inputs from a driver requesting a cooler or warmer cab environment, monitor an operating temperature of battery system 30 and operate one or more of power source 24 and accessories 42 including A/C compressor 42A, a water pump (not shown) and valves or fans to circulate refrigerant through a refrigerant system (not shown), coolant through a coolant system (including radiator 28) or an ambient air heat exchange system to adjust the operating temperature of battery system 30 and the cab environment.

Thermal Management System—Operation

Embodiments of a thermal management system may be configured for start mode, driving mode, auxiliary power unit (APU) mode, and emergency operation (EO) of vehicle 10. A thermal management system for vehicle 10 may transfer heat using one or more of an ambient air heat exchanger, an exhaust heat exchanger, a refrigerant system and a coolant system to adjust an operating temperature of battery system 30 and a temperature of the cab environment. Embodiments of a thermal management system may be configured to close clutch 41A to operate A/C compressor 42A in a refrigerant system to manage operating temperatures of battery system 120 and a temperature of cab 16. Embodiments of a thermal management system may be configured to close a clutch (not shown) in accessory gear pass 40 to operate a water pump to manage operating temperatures of battery system 120 and a temperature of cab 16.

Operation of Power Source Based on Terrain

Embodiments may manage operation of power source 24 to improve the efficiency of power source 24 and battery system 120 to extend the range of vehicle 10. In some embodiments a system controller may determine vehicle 10 is approaching a long uphill grade and operate power source 24 in an overdrive mode to provide additional power to maintain vehicle speed on the uphill grade. In some embodiments, a system controller may determine a weight of vehicle 10 and increase the amount of power available from M/G 32 for increased efficiency of M/G 32 or power source 24. For example, a system controller may operate M/G 32 with 325 horsepower (HP) available for a 30,000 pound vehicle 10 but may operate M/G 32 with 500 HP available when vehicle 10 weighs 100,000 pounds.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

What is claimed:

1. A drive train for a vehicle, the drive train comprising:
a power source selectively operable to generate rotational power;
a first motor/generator coupled to the power source and operable by the power source to generate electric power;
a second motor/generator coupled to at least one rear axle of a plurality of axles operable as a motor or a generator;
a battery system comprising one or more batteries; and
a controller configured to perform at least three of:
signal the power source to operate;
signal the power source to shut off;
signal one or more of the first motor/generator to operate as a first motor and the second motor/generator to operate as a second motor;
signal the battery system to supply electric power to one or more of the first motor/generator configured to operate as the first motor and the second motor/generator configured to operate as the second motor; and
signal one or more of the first motor/generator to operate as a first generator and the second motor/generator to operate as a second generator to supply electric power to the battery system,
wherein the controller is operable to use a battery management system to configure the drive train to use rotational power to charge the battery system in a basic regeneration mode or a high regeneration mode to provide resistance to slow the vehicle, and wherein the controller is configured to adjust to extend an operating range of the vehicle by adjusting a state of charge (SoC), an operating temperature of the battery system, and the power source based on a weight of the vehicle, topographical data, and one or more environmental conditions; and
wherein the controller is operable to switch between the basic regeneration mode and the high regeneration mode based on a speed threshold of the vehicle, wherein the basic regeneration mode uses the second motor/generator to charge the battery system and provide resistance for slowing down the vehicle when the vehicle is driving below the speed threshold, and wherein the high regeneration mode uses both the first motor/generator and the second motor/generator to charge the battery system and provide additional resistance for slowing down the vehicle when the vehicle is driving above the speed threshold.

2. The drive train of claim 1, wherein the controller is configured to:
determine a state of charge of the battery system is below a minimum state of charge;
signal the first motor/generator to operate as a generator; and
signal the power source to operate to cause the first motor/generator to supply electric power to the battery system.

3. The drive train of claim 1, wherein the controller is configured to:
signal the second motor/generator to operate as a motor; and
signal the battery system to supply electric power to the second motor/generator to supply rotational power to the at least one rear axle.

4. The drive train of claim 1, further comprising a front axle and two rear axles among the plurality of axles, wherein:
the controller is configured to:
signal the second motor/generator to operate as a motor; and
signal the battery system to supply electric power to the second motor/generator to supply rotational power to the two rear axles.

5. The drive train of claim 1, wherein the controller is configured to:
signal the first motor/generator to operate as a generator;
signal the second motor/generator to operate as a motor; and
signal the power source to operate to cause the first motor/generator to supply electric power to the second motor/generator, wherein the second motor/generator is configured to receive the electric power from the first motor/generator and generate rotational power to the at least one rear axle.

6. The drive train of claim 1, wherein the controller is configured to:
signal the second motor/generator to operate as a generator;
wherein rotational power from the at least one rear axle causes the second motor/generator to supply electric power to the battery system.

7. The drive train of claim 1, further comprising two rear axles among the plurality of axles, wherein the controller is configured to:
signal the second motor/generator to operate as a generator, wherein rotational power from the two rear axles causes the second motor/generator to supply electric power to the battery system.

8. The drive train of claim 1, further comprising a front axle and two rear axles among the plurality of axles, wherein:
the controller is configured to:
signal the first motor/generator to operate as a generator;
signal the second motor/generator to operate as a generator; and
signal the power source to operate;
wherein rotational power from the front axle and the two rear axles causes the first motor/generator and the second motor/generator to supply electric power to the battery system and the power source resists the rotational power.

9. The drive train of claim 1, wherein the controller is configured to:
signal the first motor/generator to operate as a motor;
signal the battery system to supply electric power to the first motor/generator to provide rotational power to an accessory gear pass; and
signal the battery system to supply electric power to the second motor/generator to supply rotational power to the at least one rear axle.

10. The drive train of claim 1, wherein the controller is configured to signal the battery system to supply electric power to the first motor/generator to provide rotational power to an accessory gear pass; and signal the battery system to supply electric power to the second motor/generator to supply rotational power to the at least one rear axle.

11. A drive train for installation in a vehicle, wherein the vehicle is a semi-tractor, the drive train comprising:
- a power source operable to generate rotational power;
- a first motor/generator selectively coupled to the power source and configurable to operate as a first motor or a first generator;
- a second motor/generator that is coupled to at least one rear axle among a plurality of axles of the vehicle, selectively coupled to one or more of the power source and the first motor/generator, and configurable to operate as a second motor or a second generator;
- a battery system comprising one or more batteries;
- a battery management system operable to monitor performance of the battery system and configure the drive train to maintain an operating temperature of one or more batteries within a range of operating temperatures; and
- a controller for configuring the drive train to operate using only the power source, only the batteries, or a combination of the power source and the batteries in any of an engine start mode, a battery charge mode, a driving mode using the power source to drive the vehicle and charge the batteries, a driving mode using only the batteries to drive the first motor/generator, a driving mode using only the batteries to drive both the first motor/generator and the second motor/generator, a driving mode using the power source to drive the vehicle and also using the batteries to drive both the first motor/generator and the second motor/generator using the at least one rear axle, a driving mode using the power source to drive the vehicle and also using the batteries to drive both the first motor/generator and the second motor/generator using both the at least one rear axle and a second rear axle of the vehicle, a battery bypass mode, two or more different regeneration modes, and a full drive train braking mode,
- wherein the controller is operable to use the battery management system to configure the drive train to use rotational power from the power source based on the operating temperature of the battery system,
- wherein the controller is operable to use a battery management system to configure the drive train to use rotational power to charge the battery system in a basic or high regeneration mode to provide resistance to slow the vehicle, and wherein the controller is configured to adjust to extend an operating range of the vehicle by adjusting a state of charge (SoC), an operating temperature of the battery system and the power source based on a weight of the vehicle, topographical data, and one or more environmental conditions, and
- wherein the controller is operable to switch between the basic regeneration mode and the high regeneration mode based on a speed threshold of the vehicle, wherein the basic regeneration mode uses the second motor/generator to charge the battery system and provide resistance for slowing down the vehicle when the vehicle is driving below the speed threshold, and wherein the high regeneration mode uses both the first motor/generator and the second motor/generator to charge the battery system and provide additional resistance for slowing down the vehicle when the vehicle is driving above the speed threshold.

12. The drive train of claim 11, wherein the controller is configured to configure the drive train via three or more of: signaling the power source to operate; signaling the power source to shut off; signaling one or more of the first motor/generator to operate as the first motor and the second motor/generator to operate as the second motor; signaling the battery system to supply electric power to one or more of the first motor/generator configured to operate as the first motor and the second motor/generator configured to operate as the second motor; signaling one or more of the first motor/generator to operate as the first generator and the second motor/generator to operate as the second generator to supply electric power to the battery system.

13. The drive train of claim 11, wherein the controller is configured to signal the first motor/generator to operate as a motor; and signal the battery system to supply electric power from the battery system to the first motor/generator to start the power source.

14. The drive train of claim 11, wherein the controller is configured to determine a state of charge of the battery system is below a minimum state of charge; signal the first motor/generator to operate as a generator; and signal the power source to operate to cause the first motor/generator to supply electric power to the battery system.

15. The drive train of claim 11, wherein the controller is configured to signal the power source to operate; signal the first motor/generator to operate as a motor; signal the second motor/generator to operate as a motor; and signal the battery system to supply electric power to one or more of the first motor/generator and the second motor/generator to supply rotational power to the at least one rear axle.

16. The drive train of claim 11, wherein the controller is configured to signal the second motor/generator to operate as a motor; and signal the battery system to supply electric power to the second motor/generator to supply rotational power to at least one real axle.

17. The drive train of claim 11, wherein the controller is configured to signal the first motor/generator to operate as a generator; signal the second motor/generator to operate as a motor; and signal the power source to operate to cause the first motor/generator to supply electric power to the second motor/generator, wherein the second motor/generator is configured to receive the electric power from the first motor/generator and generate rotational power to the at least one rear axle.

18. The drive train of claim 11, wherein the controller is configured to signal the second motor/generator to operate as a generator, wherein rotational power from the at least one rear axle causes the second motor/generator to supply electric power to the battery system.

19. The drive train of claim 11, further comprising two rear axles among the plurality of axles, wherein the controller is configured to signal the second motor/generator to operate as a generator, wherein rotational power from the two rear axles causes the second motor/generator to supply electric power to the battery system.

20. The drive train of claim 11, further comprising a front axle and two rear axles among the plurality of axles, wherein the controller is configured to signal the first motor/generator to operate as a generator; and signal the second motor/generator to operate as a generator; signal the power source to operate; wherein rotational power from the front axle and the two rear axles causes the first motor/generator and the second motor/generator to supply electric power to the battery system and the power source resists the rotational power.

* * * * *